US011695940B2

(12) United States Patent
Ramasubramonian et al.

(10) Patent No.: US 11,695,940 B2
(45) Date of Patent: *Jul. 4, 2023

(54) AFFINE LINEAR WEIGHTED INTRA PREDICTION IN VIDEO CODING

(71) Applicant: QUALCOMM Incorporated, San Diego, CA (US)

(72) Inventors: Adarsh Krishnan Ramasubramonian, Irvine, CA (US); Geert Van der Auwera, Del Mar, CA (US); Luong Pham Van, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,086

(22) Filed: Mar. 1, 2022

(65) Prior Publication Data

US 2022/0248035 A1 Aug. 4, 2022

Related U.S. Application Data

(63) Continuation of application No. 16/867,208, filed on May 5, 2020, now Pat. No. 11,284,093.

(Continued)

(51) Int. Cl.
*H04N 19/00* (2014.01)
*H04N 19/176* (2014.01)
(Continued)

(52) U.S. Cl.
CPC ........... *H04N 19/176* (2014.11); *H04N 19/11* (2014.11); *H04N 19/159* (2014.11)

(58) Field of Classification Search
CPC ...................................................... H04N 19/00
See application file for complete search history.

(56) References Cited

U.S. PATENT DOCUMENTS

2020/0322620 A1* 10/2020 Zhao .................... H04N 19/186
2020/0359033 A1   11/2020 Ramasubramonian et al.

FOREIGN PATENT DOCUMENTS

WO   WO-2020053394 A1   3/2020
WO   WO-2020221373 A1   11/2020

OTHER PUBLICATIONS

Bossen F., et al., "JEM Software Manual", Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

(Continued)

*Primary Examiner* — Maryam A Nasri
(74) *Attorney, Agent, or Firm* — Shumaker & Sieffert, PA

(57) ABSTRACT

A video coder performs a Most-Probable Mode (MPM) derivation process that derives one or more MPMs for a current block that is not coded using affine linear weighted intra prediction (ALWIP). As part of performing the MPM derivation process, the video coder determines whether a neighboring block of the current block is an ALWIP-coded neighboring block. Based on the neighboring block being an ALWIP-coded neighboring block, the video coder determines that a value of an intra prediction mode of the neighboring block is a value indicating a planar mode. The video coder codes the current block based on one of the MPMs for the current block.

11 Claims, 20 Drawing Sheets

Related U.S. Application Data

(60) Provisional application No. 62/864,320, filed on Jun. 20, 2019, provisional application No. 62/845,790, filed on May 9, 2019.

(51) Int. Cl.
*H04N 19/159* (2014.01)
*H04N 19/11* (2014.01)

(56) References Cited

OTHER PUBLICATIONS

Bossen F., et al., "Non-CE3: A Unified Luma Intra Mode list Construction Process", Joint Video Experts Team (JVET) of ITU-T SG 16 WP 3 and ISO/IEC JTC 1/SC 29/WG 11, Document: JVET-M0528-r1, 13th Meeting: Marrakech, MA, Jan. 9-18, 2019, pp. 1-4.

Bross B, et al., "Versatile Video Coding (Draft 3)," 12. JVET Meeting; Oct. 3, 2018-Oct. 12, 2018, Macao, (The Joint Video Exploration Team of ISO/IEC JTC1/SC29/WG11 and ITU-T SG.16), No. JVET-L1001-v9, Jan. 8, 2019 (Jan. 8, 2019), XP030200889, 230 pages, Retrieved from the Internet: URL: http://phenix.int-evry.fr/jvet/doc_end_user/documents/12_Macao/wg11/JVET-L1001-v13.zip JVET-L1001-v9.docx [retrieved on Jan. 8, 2019] Section 8.4.4.9, Definition clauses 3.22 and 3.23, Section 8.4.2.13.

Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-V7, 298 Pages, Retrieved from the Internet: URL: http://phenix.int-evry.fr/jvet/doc_end_user/documents/13_Marrakech/wg11/JVET-M1001-v7.zip JVET-M1001-v7.docx. [retrieved on Mar. 17, 2019] the whole document.

Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages.

Bross B., et al., "Versatile Video Coding (Draft 5)", Joint Video Experts Team (JVET) of ITU-T SG 16 WP 3 and ISO/IEC JTC 1/SC 29/WG 11, JVET-N1001-v5, 14th Meeting: Geneva, CH, Mar. 19, 2019-Mar. 27, 2019, No. JVET-N1001, May 14, 2019 (May 14, 2019), XP030205193, 370 Pages, Retrieved from the Internet: URL: http://phenix.int-evry.fr/jvet/doc_end_user/documents/14_Geneva/wg11/JVET-N1001-v5.zip JVET-N1001-v5.docx, [retrieved on May 14, 2019] pp. 94-98, paragraph 7.4.6.3., cited in the application Section 8.5.6.4; p. 212-p. 214.

PCT/CN2019/085399, filed on May 1, 2019, 92 Pages.

Chen J., et al., "Algorithm Description for Versatile Video Coding and Test Model 2 (VTM 2)", Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.

Chen J., et al., "Algorithm Description for Versatile Video Coding and Test Model 3 (VTM 3)," 12th JVET Meeting, Oct. 3, 2018-Oct. 12, 2018, Macao, (The Joint Video Exploration Team of ISO/IEC JTC1/SC29/WG11 and ITU-T SG.16 WP 3), No. JVET-L1002-v1, Dec. 24, 2018 (Dec. 24, 2018), XP030251962, pp. 1-48, Retrieved from the Internet: URL: http://phenix.int-evry.fr/jvet/doc_end_user/documents/12_Macao/wg11/JVET-L1002-v2.zip JVET-L1002-v2.docx [retrieved on Dec. 24, 2018] Cited in the Application Section [3.2.2 Partitioning of the CTUs Using a Tree Structure], Section [3.2.5 Virtual Pipeline Data Units (VPDUs)], section 3.7 p. 1.

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1st Meeting: Geneva, CH, Oct. 19-21, 2015, No. H.266, JVET-A1001, Feb. 24, 2016 (Feb. 24, 2016), XP030150000, 27 Pages, URL: http://phenix.int-evry.fr/jvet/.

Choi J., et al., "Non-CE3: Simplified Mode mapping in MIP," 15. JVET Meeting; Jul. 3, 2019-Jul. 12, 2019; Gothenburg; (The Joint Video Exploration Team of ISO/IEC JTC1/SC29/WG11 and ITU-TSG.16), No. JVET-O0396, Jul. 3, 2019 (Jul. 3, 2019), XP030219452, 6 pages, Retrieved from the Internet: URL: http://phenix.int-evry.fr/jvet/doc_end_user/documents/15_Gothenburg/wg11/JVET-O0396-v2.zip JVET-O0396v2.docx [retrieved on [Jul. 3, 2019],section 2.

Helle P., et al., "CE3: Non-linear Weighted Intra Prediction (tests 2.2.1 and 2.2.2)," 12. JVET Meeting, Oct. 3, 2018-Oct. 12, 2018, Macao, (The Joint Video Exploration Team of ISO/IEC JTC1/SC29/WG11 and ITU-TSG.16) No. JVET-L0199, Sep. 28, 2018 (Sep. 28, 2018), XP030193995, 9 pages, Retrieved from the Internet: URL: http://phenix.int-evry.fr/jvet/doc_end_user/documents/12_Macao/wg11/JVET-L0199-v2.zip JVET-L0199-v2.docx [retrieved on Sep. 28, 2018] sections 1.3, 1.4, 2.1-2.3.

Helle P., et al., "CE3-related: Non-linear Weighted Intra Prediction (Cross-Check Report in JVET-K0262)," 11. JVET Meeting, Jul. 10, 2018-Jul. 18, 2018; Ljubljana; (The Joint Video Exploration Team of ISO/IEC JTC1/SC29/WG11 and ITU-TSG.16), No. JVET-K0196, Jul. 11, 2018 (Jul. 11, 2018), XP030199426, 7 pages, Retrieved from the Internet: URL:http://phenix.int-evry.fr/jvet/doc_end_user/documents/11_Ljubljana/wg11/JVET-K0196-v3.zip JVET-K0196_r2.docx [retrieved on Jul. 11, 2018], abstract, section 1.6.

Helle P., et al., "Variations of the 8-bit Implementation of MIP", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0481-v3, pp. 1-8.

Hernandez S., et al., "CE3: Intra Sub-Partitions Coding Mode (Tests 1.1.1 and 1.1.2)", Joint Video Experts Team (JVET) of ITU-T SG 16 WP 3 and ISO/IEC JTC 1/SC 29/WG 11, Document: JVET-M0102-V5, 13th Meeting: Marrakech, MA, Jan. 9-18, 2019, pp. 1-9.

International Search Report and Written Opinion—PCT/US2020/031651—ISA/EPO—dated Jun. 18, 2020.

ITU-T H.265, "Series H: Audiovisual and Multimedia Systems, Infrastructure of Audiovisual Services—Coding of Moving Video, High efficiency Video Coding", The International Telecommunication Union, Dec. 2016, 664 Pages.

Kondo K., et al., "Non-CE3: On Adaptive Rounding Offset of MIP", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0407-v2, pp. 1-4.

Pang C., et al., "AhG8: Context Derivation Method for intra_bc_flag Coding," 15. JCT-VC Meeting, Oct. 23, 2013-Jan. 11, 2013, Geneva, (Joint Collaborative Team on Video Coding of ISO/IEC JTC1/SC29/WG11 and ITU-TSG.16 WP3), URL: HTTP://WFTP3.ITU.INT/AV-ARCH/JCTVC-SITE/, No. JCTVC-O0158, Oct. 15, 2013 (Oct. 15, 2013), XP030115180, section 2.1,5 pages.

Pfaff J., et al., "8-bit Implementation and Simplification of MIP", 15. JVET Meeting, Jul. 3, 2019-Jul. 12, 2019, Gothenburg, (The Joint Video Exploration Team of ISO/IEC JTC1/SC29/WG11 and ITU-T SG.16 ), No. JVET-00084, Jun. 18, 2019 (Jun. 18, 2019), XP030205620, 7 pages, Retrieved from the Internet: URL: http://phenix.int-evry.fr/jvet/doc_end_user/documents/15_Gothenburg/wg11/JVET-O0084-v1.Zip. JVET-O0084-v1.docx. [Retrieved on Jun. 18, 2019] the whole document.

Pfaff J., et al., "CE3: Affine Linear Weighted Intra Prediction (CE3-4.1, CE3-4.2)", The Joint Video Exploration Team of ISO/IEC JTC1/SC29/WG11, 14. JVET Meeting, Mar. 19, 2019-Mar. 27, 2019, Geneva, No. JVET-N0217-V1, Mar. 12, 2019 (Mar. 12, 2019), XP030202699, 17 pages, Retrieved from the Internet: URL: http://phenix.int-evry.fr/jvet/doc_end_user/documents/14_Geneva/wg11/JVET-N0217-v1 .zip JVET-N0217_v1.docx [retrieved on Mar. 12, 2019] cited in the application, sections 1.1-1.10.

Pfaff J., et al., "Non-CE3: Harmonization of 8-Bit MIP with Unified-MPM and LFNST", Joint Video Experts Team (JVET) of ITU-T SG 16 WP 3 and ISO/IEC JTC 1/SC 29/WG 11, JVET-O0485-V2, 15th Meeting: Gothenburg, SE, Jul. 3-12, 2019, Document: JVET-O0485-r2, pp. 1-4.

Pfaff J., et al., "Non-CE3: Simplifications of MIP," 15. JVET Meeting; Jul. 3, 2019-Jul. 12, 2019; Gothenburg; (The Joint Video ExplorationTeam of ISO/IEC JTC1/SC29/WG11 and ITU-T SG.16) No. JVET-O0925, Jul. 2, 2019 (Jul. 2, 2019), XP030220550, 3 pages, Retrieved from the Internet:URL: http://phenix.int-evry.fr/

(56) References Cited

OTHER PUBLICATIONS jvet/doc_end_user/documents/15_Gothenburg/wg11/JVET-O0925-v1 .zip JVET-O0925-v1/JVET-O0925-v1.docx [retrieved on Jul. 2, 2019], section 1.

Pfaff J., et al., "Non-CE3: Simplifications of MIP", Joint Video Experts Team (JVET) of ITU-T SG 16 WP 3 and ISO/IEC JTC 1/SC 29/WG 11, JVET-O0925-v3, 15th Meeting: Gothenburg, SWE, Jul. 3-12, 2019, Document: JVET-O0925-r3, pp. 1-4.

Ramasubramonian A K., et al., "Non-CE3: MIP Simplifications," 15. JVET Meeting, Jul. 3, 2019-Jul. 12, 2019, Gothenburg, (The Joint Video Exploration Team of ISO/IEC JTC1/SC29/WG11 and ITU-TSG.16 WP 3), No. JVET-O0187, Jul. 4, 2019 (Jul. 4, 2019), XP030218788, 6 pages, Retrieved from the Internet: URL: http://phenix.int-evry.fr/jvet/doc_end_user/documents/15_Gothenburg/wg11/JVET-O0187-v3.zip JVET-00187-v3.docx [retrieved on Jul. 4, 2019], section 2.

Salehifar M., et al., "CE3 Related: No MPM Derivation for Matrix Based Intra Prediction (MIP)", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0169-V2, pp. 1-4.

Sasai H., et al., "Modified Context Derivation for Complexity reduction",6. JCT-VC Meeting, 97 MPEG Meeting, Joint Collaborative Team on Video Coding (JCT-VC) of ITU-T SG16 WP3 and ISO/IEC JTC1/SC29/WG11, 6th Meeting, Torino, IT, Jul. 14, 2011-Jul. 22, 2011, No. JCTVC-F429, Jul. 1, 2011 (Jul. 1, 2011), pp. 1-18, XP030009452.

Sasai H, et al., "Modified Context Derivation for Neighboring Dependency Reduction", 6. JCT-VC Meeting, Jul. 14, 2011-Jul. 22, 2011; Torino, (Joint Collaborative Team on Video Coding of ISO/IEC JTC1/SC29/WG11 and ITU-TSG.16), No. JCTVC-F429, Jul. 21, 2011 (Jul. 21, 2011), XP030229226, 18 pages, Retrieved from the Internet: URL: http://phenix.int-evry.fr/jct/doc_end_user/documents/6_Torino/wg11/JCTVC-F429-v3.zip JCTVC-F429r1.doc [retrieved on Jul. 21, 2011] p. 2.

Yao J., et al., "Non-CE3: Intra Prediction Information Coding", JVET-M0210-V3, Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0210-r2, pp. 1-7.

Zhang Z., et al., "Non-CE3: MIP Low Resolution Clipping", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0168-V2, pp. 1-7, Retrieved from the Internet: URL: http://phenix.int-evry.fr/jvet/doc_end_user/documents/15_Gothenburg/wg11/JVET-O0168-v3.zip—[retrieved on Jun. 25, 2019] the whole document.

Zhang Z., et al., "Non-CE3: Sample Value Clipping on MIP Reduced Prediction", Joint Video Experts Team (JVET) of ITU-T SG 16 WP 3 and ISO/IEC JTC 1/SC 29/WG 11, JVET-O0160, 15th Meeting: Gothenburg, SE, Jul. 3-12, 2019, Document: JVET-O0160, pp. 1-7, Retrieved from the Internet: URL: http://phenix.int-evry.fr/jvet/doc_end_user/documents/15_Gothenburg/wg11/JVET-O0160-v1.zip-[retrieved on Jun. 20, 2016].

Zhang Z., et al., "Non-CE3: Simplification on MIP Boundary Sample Downsampling Process", Joint Video Experts Team (JVET) of ITU-T SG 16 WP 3 and ISO/IEC JTC 1/SC 29/WG 11, JVET-O0161, 15th Meeting: Gothenburg, SE, Jul. 3-12, 2019, Document: JVET-O0161, pp. 1-9.

Zhao L., et al., "CE3-Related: Unification of Angular Intra Prediction for Square and Nonsquare Blocks," 12. JVET Meeting, Oct. 3, 2018-Oct. 12, 2018, Macao, (The Joint Video Exploration Team of ISO/IEC JTC1/SC29/WG11 and ITU-TSG.16), No. JVET-L0279, Oct. 6, 2018 (Oct. 6, 2018), XP030195082, pp. 1-10, Retrieved from the Internet: URL:http://phenix.int-evry.fr/jvet/doc_end_user/documents/12_Macao/wg11/JVET-L0279-v3.zip JVET-L0279-v1.docx [retrieved on Oct. 6, 2018] cited in the application the whole document.

Helle P., et al., "CE3-Related: Non-Linear Weighted Intra Prediction (Cross-Check Report in JVET-K0262)", JVET-K0196-v2, 11. JVET Meeting, Jul. 10, 2018-Jul. 18, 2018, 6 Pages, Ljubljana, SI (The Joint Video Exploration Team of ISO/IEC JTC1/SC29/WG11 and ITU-T SG 16) Jul. 4, 2018.

Pfaff J., et al., "CE3: Affine Linear Weighted Intra Prediction (CE3-4.1, CE3-4.2)", The Joint Video Exploration Team of ISO/IEC JTC1/SC29/WG11, 14. JVET Meeting, Mar. 19, 2019-Mar. 27, 2019, Geneva, No. JVET-N0217-V2, Mar. 19, 2019 (Mar. 19, 2019), 17 Pages.

* cited by examiner

| predModeIntra | | | | | | | | | | | | | | −14 | −13 | −12 | −11 |
|---|---|---|---|---|---|---|---|---|---|---|---|---|---|---|---|---|---|
| intraPredAngle | | | | | | | | | | | | | | 512 | 341 | 256 | 171 |
| predModeIntra | −9 | −8 | −7 | −6 | −5 | −4 | −3 | −2 | −1 | 2 | 3 | 4 | 5 | 6 | 7 | 8 | |
| intraPredAngle | 102 | 86 | 73 | 64 | 57 | 51 | 45 | 39 | 35 | 32 | 29 | 26 | 23 | 20 | 18 | 16 | |
| predModeIntra | 10 | 11 | 12 | 13 | 14 | 15 | 16 | 17 | 18 | 19 | 20 | 21 | 22 | 23 | 24 | 25 | |
| intraPredAngle | 12 | 10 | 8 | 6 | 4 | 3 | 2 | 1 | 0 | −1 | −2 | −3 | −4 | −6 | −8 | −10 | |
| predModeIntra | 27 | 28 | 29 | 30 | 31 | 32 | 33 | 34 | 35 | 36 | 37 | 38 | 39 | 40 | 41 | 42 | |
| intraPredAngle | −14 | −16 | −18 | −20 | −23 | −26 | −29 | −32 | −29 | −26 | −23 | −20 | −18 | −16 | −14 | −12 | |
| predModeIntra | 44 | 45 | 46 | 47 | 48 | 49 | 50 | 51 | 52 | 53 | 54 | 55 | 56 | 57 | 58 | 59 | |
| intraPredAngle | −8 | −6 | −4 | −3 | −2 | −1 | 0 | 1 | 2 | 3 | 4 | 6 | 8 | 10 | 12 | 14 | |
| predModeIntra | 61 | 62 | 63 | 64 | 65 | 66 | 67 | 68 | 69 | 70 | 71 | 72 | 73 | 74 | 75 | 76 | |
| intraPredAngle | 18 | 20 | 23 | 26 | 29 | 32 | 35 | 39 | 45 | 51 | 57 | 64 | 73 | 86 | 102 | 128 | |
| predModeIntra | 78 | 79 | 80 | | | | | | | | | | | | | | |
| intraPredAngle | 256 | 341 | 512 | | | | | | | | | | | | | | |

FIG. 7

AFFINE LINEAR WEIGHTED INTRA PREDICTION IN VIDEO CODING

This application is a continuation of U.S. patent application Ser. No. 16/867,208, filed May 5, 2020, which claims the benefit of U.S. Provisional Patent Application 62/845,790, filed May 9, 2019, and U.S. Provisional Patent Application 62/864,320, filed Jun. 20, 2019. The entire content of each of U.S. patent application Ser. No. 16/867,208, U.S. Provisional Patent Application 62/845,790, and U.S. Provisional Patent Application 62/864,320 are incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for intra prediction, including the derivation and signaling of modes for linear weighted intra prediction. For instance, in one example, this disclosure describes a video coder, such as a video encoder or a video decoder, that performs a Most-Probable Mode (MPM) derivation process that derives one or more MPMs for a current block that is not coded using affine linear weighted intra prediction (ALWIP). The MPMs for the current block may be intra prediction modes determined to be most likely to be used for coding the current block. As part of performing the MPM derivation process, the video coder determines whether a neighboring block of the current block is an ALWIP-coded neighboring block. Based on the neighboring block being an ALWIP-coded neighboring block, the video coder determines that a value of an intra prediction mode of the neighboring block is a default value, such as a value corresponding to a planar mode. The video coder codes the current block based on one of the MPMs for the current block.

In one example, this disclosure describes a method of coding video data, the method comprising: performing a Most-Probable Mode (MPM) derivation process that derives one or more MPMs for a current block of the video data, wherein the current block is not coded using affine linear weighted intra prediction (ALWIP), and performing the MPM derivation process comprises: determining whether a neighboring block of the current block is an ALWIP-coded neighboring block; and based on the neighboring block being an ALWIP-coded neighboring block: determining that a value of an intra prediction mode of the neighboring block is a default value; and including an intra prediction mode corresponding to the default value as one of the one or more MPMs; and coding the current block based on one of the MPMs for the current block.

In another example, this disclosure describes a device for coding video data, the device comprising: a memory to store the video data; and one or more processors implemented in circuitry, the one or more processors configured to: perform a Most-Probable Mode (MPM) derivation process that derives one or more MPMs for a current block of the video data, wherein the current block is not coded using affine linear weighted intra prediction (ALWIP), and performing the MPM derivation process comprises: determine whether a neighboring block of the current block is an ALWIP-coded neighboring block; and based on the neighboring block being an ALWIP-coded neighboring block: determine that a value of an intra prediction mode of the neighboring block is a default value; and include an intra prediction mode corresponding to the default values as one of the one or more MPMs; and code the current block based on one of the MPMs for the current block.

In another example, this disclosure describes a device for coding video data, the device comprising: means for performing a Most-Probable Mode (MPM) derivation process that derives one or more MPMs for a current block of the video data, wherein the current block is not coded using affine linear weighted intra prediction (ALWIP), and the means for performing the MPM derivation process comprises: means for determining whether a neighboring block of the current block is an ALWIP-coded neighboring block; and means for determining, based on the neighboring block being an ALWIP-coded neighboring block, that a value of an intra prediction mode of the neighboring block is a default value and including an intra prediction mode corresponding to the default value as one of the one or more MPMs; and means for coding the current block based on one of the MPMs for the current block.

In another example, this disclosure describes a computer-readable storage medium having stored thereon instructions that, when executed, cause one or more processors to: perform a Most-Probable Mode (MPM) derivation process that derives one or more MPMs for a current block of video data, wherein the current block is not coded using affine linear weighted intra prediction (ALWIP), and performing the MPM derivation process comprises: determine whether a neighboring block of the current block is an ALWIP-coded neighboring block; and based on the neighboring block being an ALWIP-coded neighboring block: determine that a value of an intra prediction mode of the neighboring block is a default value; and include an intra prediction mode corresponding to the default value as one of the one or more MPMs; and code the current block based on one of the MPMs for the current block.

The details of one or more examples are set forth in the accompanying drawings and the description below. Other features, objects, and advantages will be apparent from the description, drawings, and claims.

BRIEF DESCRIPTION OF DRAWINGS

FIG. 7 is a table providing a specification of intra prediction angles.

DETAILED DESCRIPTION

Figure 1:
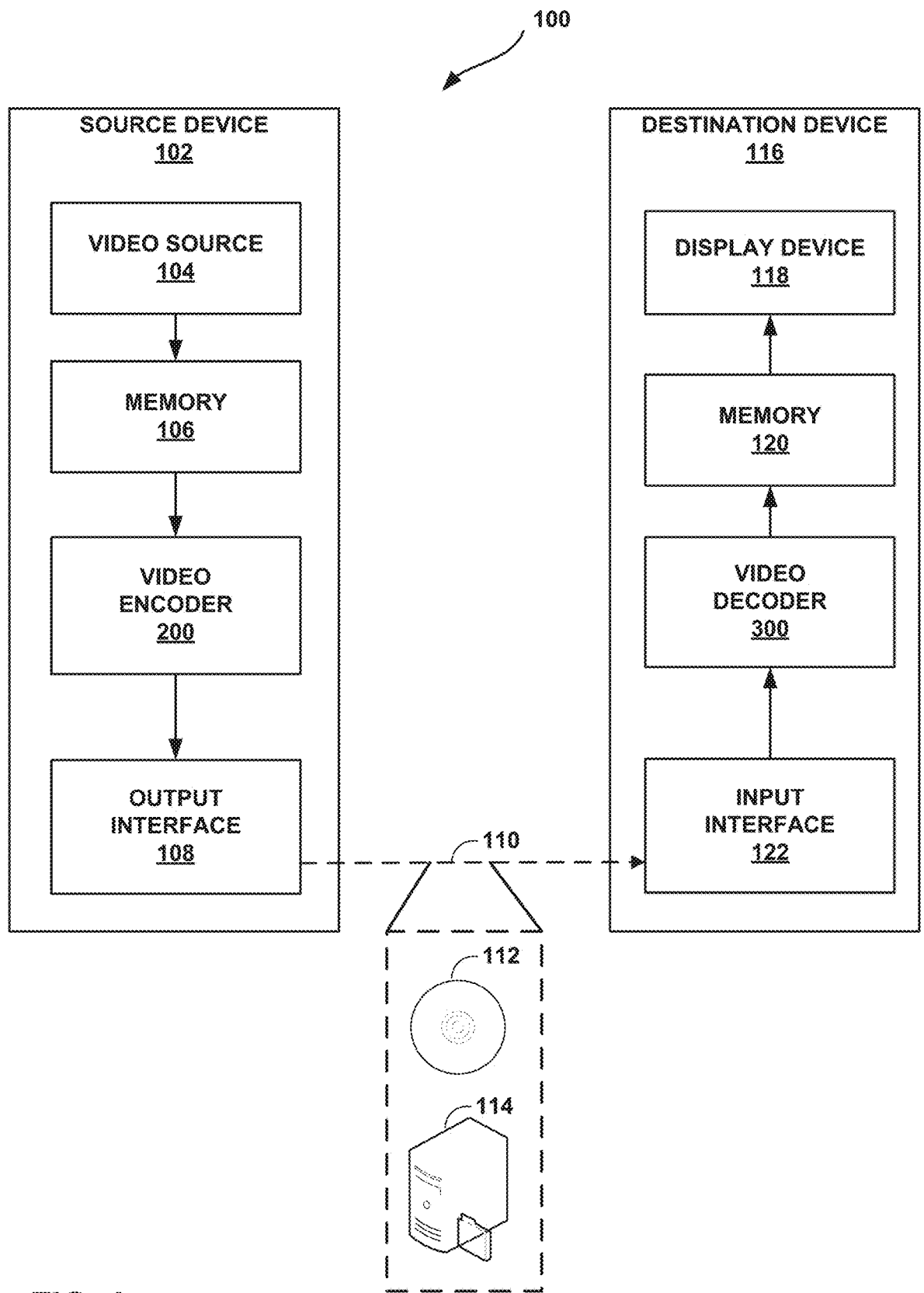
FIG. 1 is a block diagram illustrating an example video encoding and decoding system that may perform the techniques of this disclosure.

Affine linear weighted intra prediction (ALWIP) is a form of intra prediction in which a prediction block is generated by down-sampling reference samples of a block, multiplying a vector of the down-sampled reference samples by a matrix and adding a bias vector, mapping the resulting sample values into predetermined positions within the prediction block, and performing linear interpolation on the sample values in the prediction block to determine sample values for the remaining positions within the prediction block. The use of ALWIP may lead to better coding efficiencies for some types of blocks, but regular intra prediction techniques may lead to better coding efficiencies than ALWIP for other types of blocks. Thus, some blocks within a picture may be coded using ALWIP and some blocks within a picture may be coded using regular intra prediction techniques, such as a planar intra prediction mode, a DC intra prediction mode, or a directional intra prediction mode. Although the above example describes several steps for ALWIP, some implementations may choose to exclude one or more of the above steps, and other implementations may include other steps to the derivation process. However, a core idea in ALWIP is multiplying a vector of samples derived from reference samples with a matrix (or equivalent operation).

To improve the efficiency of signaling an intra prediction mode (e.g., a planar, DC, or directional intra prediction mode), a video coder (e.g., a video encoder or a video decoder) may perform a most-probable mode (MPM) derivation process that derives one or more MPMs for a current block of video data. Each of the MPMs may be an intra prediction mode. If the optimal intra prediction mode for the current block is one of the MPMs, an index indicating one of the MPMs may be signaled in a bitstream. If the optimal intra prediction mode for the current block is not one of the MPMs, an index indicating one of the non-MPM intra prediction modes may be signaled. Because there are fewer MPMs than there are non-MPM intra prediction modes, an index indicating an MPMs may be coded using significantly fewer bits than an index indicating one of the non-MPM intra prediction modes. Thus, the use of the MPM derivation process may increase coding efficiency for some blocks.

The video coder may derive the MPMs based on the intra prediction modes of blocks that neighbor the current block. For instance, if a left neighboring block is coded using a DC intra prediction mode, the video coder may determine that one of the MPMs is the DC intra prediction mode. However, in the MPM derivation process, if one of the neighboring blocks is coded using ALWIP, the video coder performs a process that uses mapping data that maps ALWIP parameters of the neighboring block to one of the directional intra prediction modes. The ALWIP parameters include matrix coefficients and a bias vector. The video coder may then use the determined directional intra prediction mode as one of the MPMs.

Storing the mapping data increases the data storage requirements of video encoders and video decoders. The increased data storage requirements may increase the cost and complexity of video encoders and video decoders. Moreover, the lookup operations that are performed to use the mapping data take time, which may slow down the encoding and decoding processes. Additionally, a prediction block generated using an intra prediction mode determined using the mapping data is only an approximation of the prediction block that would be generated if the ALWIP parameters of the neighboring block were used. This approximation may decrease coding efficiency.

The techniques of this disclosure may address one or more of these issues. For instance, as described in an example of this disclosure, a video coder (e.g., a video encoder or a video decoder) may perform an MPM derivation process that derives one or more MPMs for a current block of the video data. In this example, the current block is not coded using ALWIP. As part of performing the MPM derivation process, the video coder may determine whether a neighboring block of the current block is an ALWIP-coded neighboring block. Based on the neighboring block being an ALWIP-coded neighboring block, the video coder may determine that a value of an intra prediction mode of the neighboring block is a default value, such as a value corresponding to a planar mode. Accordingly, the video coder may include an intra prediction mode corresponding to the default value as one of the MPMs. The video coder may code the current block based on one of the MPMs for the current block.

By using the intra prediction mode corresponding to the default value as one of the MPMs when the neighboring block is ALWIP-coded, the video coder may avoid the need to store the mapping data. Avoiding the need to store the mapping data may reduce the data storage requirements of the video coder, which may reduce the cost and complexity of the video coder. Furthermore, avoiding use of the mapping data may accelerate the encoding and decoding processes by avoiding the lookup operations involved with use of the mapping data.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may include any of a wide range of devices, including desktop computers, notebook (i.e., laptop) computers, set-top boxes, mobile devices such as telephone handsets (e.g., smartphones) and tablet computers, televisions, cameras, display devices, digital media players, video gaming consoles, video streaming device, a broadcast receiver device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for performing intra prediction, including the derivation and signaling of modes for linear weighted intra prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for performing intra prediction, including the derivation and signaling of modes for linear weighted intra prediction. Source device 102 and destination device 116 are merely examples of such coding devices in which source device 102 generates encoded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A draft of the VVC standard is described in Bross, et al. "Versatile Video Coding (Draft 4)," Joint Video Experts Team (JVET) of ITU-T SG 16 WP 3 and ISO/IEC JTC 1/SC 29/WG 11, 13th Meeting: Marrakech, Mass., 9-18 Jan. 2019, JVET-M1001 (hereinafter "VVC WD4"). Another draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14th Meeting: Geneva, CH, 19-27 Mar. 2019, JVET-N1001-v5 (hereinafter "VVC Draft 5"). An objective of VVC is to provide a significant improvement in compression performance over the existing HEVC standard, aiding in deployment of higher-quality video services and emerging applications such as 360° omnidirectional immersive multimedia and high-dynamic-range (HDR) video. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter prediction data, while TUs represent residual data. CUs that are intra predicted include intra prediction information, such as an intra prediction mode indication.

As another example, video encoder 200 and video decoder 300 may be configured to operate according to JEM or VVC. According to JEM or VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU has 16 samples in a vertical direction (y=16) and 16 samples in a horizontal direction (x=16). Likewise, an N×N CU has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter prediction or intra prediction. Inter prediction generally refers to predicting the CU from data of one or more previously coded pictures, whereas intra prediction generally refers to predicting the CU from previously coded data of the same picture. To perform inter prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter prediction mode. In affine motion compensation mode, video encoder 200 may determine two or more motion vectors that represent non-translational motion, such as zoom in or out, rotation, perspective motion, or other irregular motion types.

To perform intra prediction, video encoder 200 may select an intra prediction mode to generate the prediction block. Some examples of JEM and VVC provide sixty-seven intra prediction modes, including various directional modes, as well as a planar mode and a DC mode. In general, video encoder 200 selects an intra prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

In general, a video coder, such as video encoder 200 or video decoder 300, may generate a prediction block using planar mode as a gradient estimated from neighboring samples. For instance, in VVC WD4, a video coder may generate a prediction block using the planar intra prediction mode as follows.

8.3.4.2.5 Specification of INTRA_PLANAR Intra Prediction Mode

Inputs to this process are:
 a variable nTbW specifying the transform block width,
 a variable nTbH specifying the transform block height,
 the neighbouring samples p[x][y], with x=−1, y=−1 . . . nTbH and x=0 . . . nTbW, y=−1.

Outputs of this process are the predicted samples predSamples[x][y], with x=0 . . . nTbW−1, y=0 . . . nTbH−1.

The variables nW and nH are derived as follows:

$$nW=\text{Max}(nTbW,2) \quad (8\text{-}115)$$

$$nH=\text{Max}(nTbH,2) \quad (8\text{-}116)$$

The values of the prediction samples predSamples[x][y], with x=0 . . . nTbW−1 and y=0 . . . nTbH−1, are derived as follows:

$$\text{pred}V[x][y]=((nH-1-y)*p[x][-1]30(y+1)*p[-1][nTbH])<<\text{Log }2(nW) \quad 8\text{-}117)$$

$$\text{pred}H[x][y]=((nW-1-x)*p[-1][y]+(x+1)*p[nTbW][-1])<<\text{Log }2(nH) \quad (8\text{-}118)$$

$$\text{predSamples}[x][y]=(\text{pred}V[x][y]+\text{pred}H[x][y]+nW*nH)<<(\text{Log }2(nW)+\text{Log }2(nH)+1) \quad (8\text{-}119)$$

Video encoder 200 encodes data representing the prediction mode for a current block. For example, for inter prediction modes, video encoder 200 may encode data representing which of the various available inter-prediction modes is used, as well as motion information for the corresponding mode. For uni-directional or bi-directional inter prediction, for example, video encoder 200 may encode motion vectors using advanced motion vector prediction (AMVP) or merge mode. Video encoder 200 may use similar modes to encode motion vectors for affine motion compensation mode.

Following prediction, such as intra prediction or inter prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients through application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data. To perform CABAC, video encoder 200 may assign a context within a context model to a symbol to be transmitted.

As mentioned above, video encoder 200 and video decoder 300 may apply CABAC encoding and decoding to values of syntax elements. To apply CABAC encoding to a syntax element, video encoder 200 may binarize the value of the syntax element to form a series of one or more bits, which are referred to as "bins." In addition, video encoder 200 may identify a coding context, which may be referred to simply as a "context." The coding context may identify probabilities of bins having particular values. For instance, a coding context may indicate a 0.7 probability of coding a 0-valued bin and a 0.3 probability of coding a 1-valued bin. After identifying the coding context, video encoder 200 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, video encoder 200 may repeat these steps with the interval being the sub-interval associated with the value of the encoded bit. When video encoder 200 repeats these steps for the next bin, video encoder 200 may use modified probabilities based on the probabilities indicated by the identified coding context and the actual values of bins encoded.

When video decoder 300 performs CABAC decoding on a value of a syntax element, video decoder 300 may identify a coding context. Video decoder 300 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 300 may decode a bin having the value associated with the lower sub-interval. If the encoded value is within the upper sub-interval, video decoder 300 may decode a bin having the value associated with the upper sub-interval. To decode a next bin of the syntax element, video decoder 300 may repeat these steps with the interval being the sub-interval that contains the encoded value. When video decoder 300 repeats these steps for the next bin, video decoder 300 may use modified probabilities based on the probabilities indicated by the identified coding context and the decoded bins. Video decoder 300 may then de-binarize the bins to recover the value of the syntax element.

In some instances, video encoder 200 may encode bins using bypass CABAC coding. It may be computationally less expensive to perform bypass CABAC coding on a bin than to perform regular CABAC coding on the bin. Furthermore, performing bypass CABAC coding may allow for a higher degree of parallelization and throughput. Bins encoded using bypass CABAC coding may be referred to as "bypass bins." Grouping bypass bins together may increase the throughput of video encoder 200 and video decoder 300. The bypass CABAC coding engine may be able to code several bins in a single cycle, whereas the regular CABAC coding engine may be able to code only a single bin in a cycle. The bypass CABAC coding engine may be simpler because the bypass CABAC coding engine does not select contexts and may assume a probability of ½ for both symbols (0 and 1). Consequently, in bypass CABAC coding, the intervals are split directly in half.

Video encoder 200 may further generate syntax data, such as block-based syntax data, picture-based syntax data, and sequence-based syntax data, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

Figure 2:
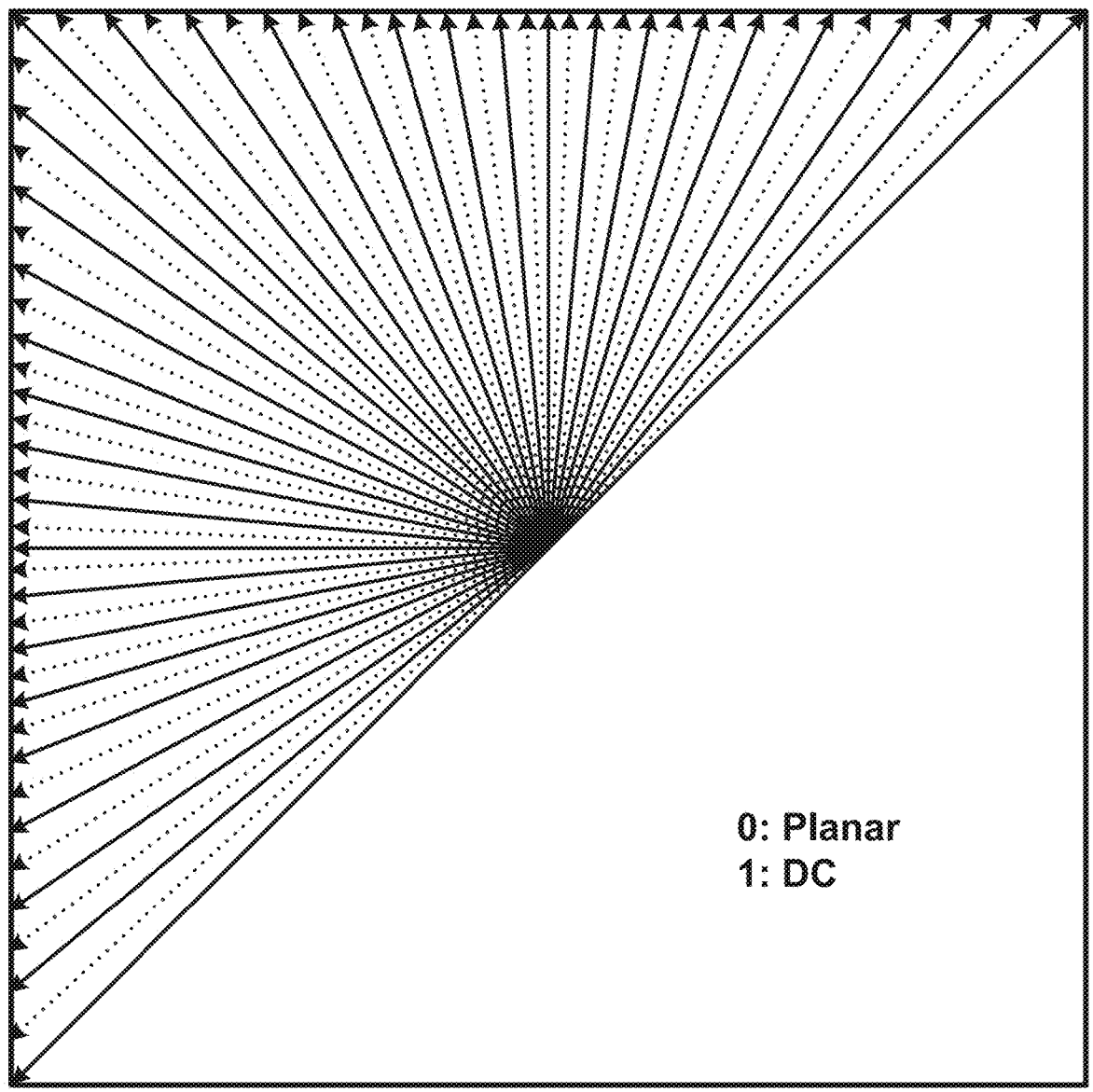
FIG. 2 is a block diagram illustrating an example of intra prediction, with arrows pointing toward reference samples.

Intra prediction involves a DC prediction mode, a planar prediction mode, and directional (or angular) prediction modes. Directional prediction for square blocks uses directions between −135 degrees to 45 degrees of the current block in the VVC test model 2 (VTM2) (J. Chen, Y. Ye, S. Kim, "Algorithm description for Versatile Video Coding and Test Model 2 (VTM2)," $11^{th}$ JVET Meeting, Ljubljana, S I, July 2018, JVET-K1002), as illustrated in FIG. 2. FIG. 2 is a block diagram illustrating an example of intra prediction, with arrows pointing toward reference samples.

In VTM2, the block structure used for specifying the prediction block for intra prediction is not restricted to be square (width w=height h). Rectangular or non-square prediction blocks (w>h or w<h) can increase the coding efficiency based on the characteristics of the content.

Figure 3:
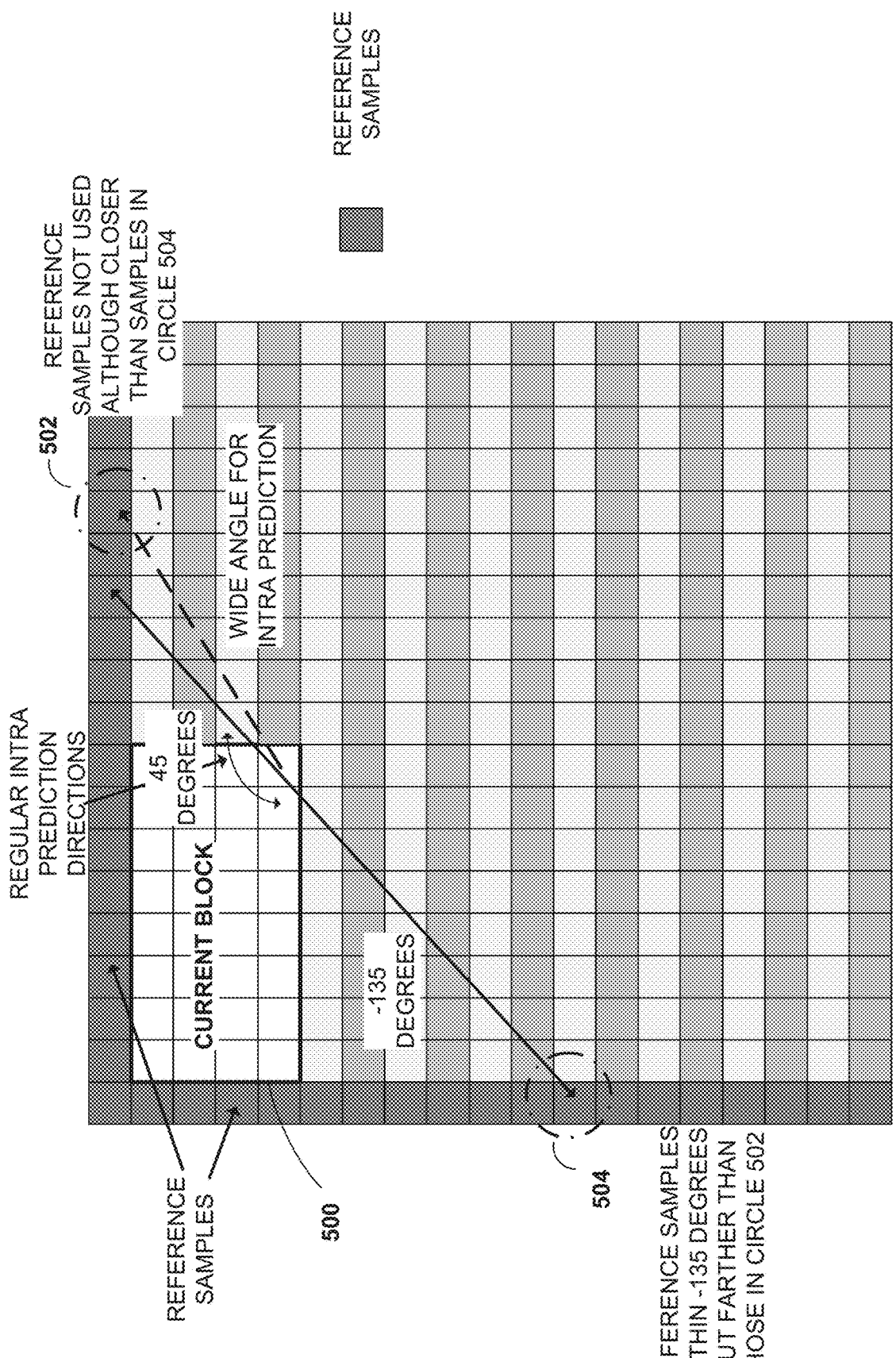
FIG. 3 is a conceptual diagram of an example of 8×4 rectangular block where "closer" reference samples are not used, but farther reference samples may be used due to a restriction of an intra prediction direction to be in the range of −135 degrees to 45 degrees.
Figure 4:
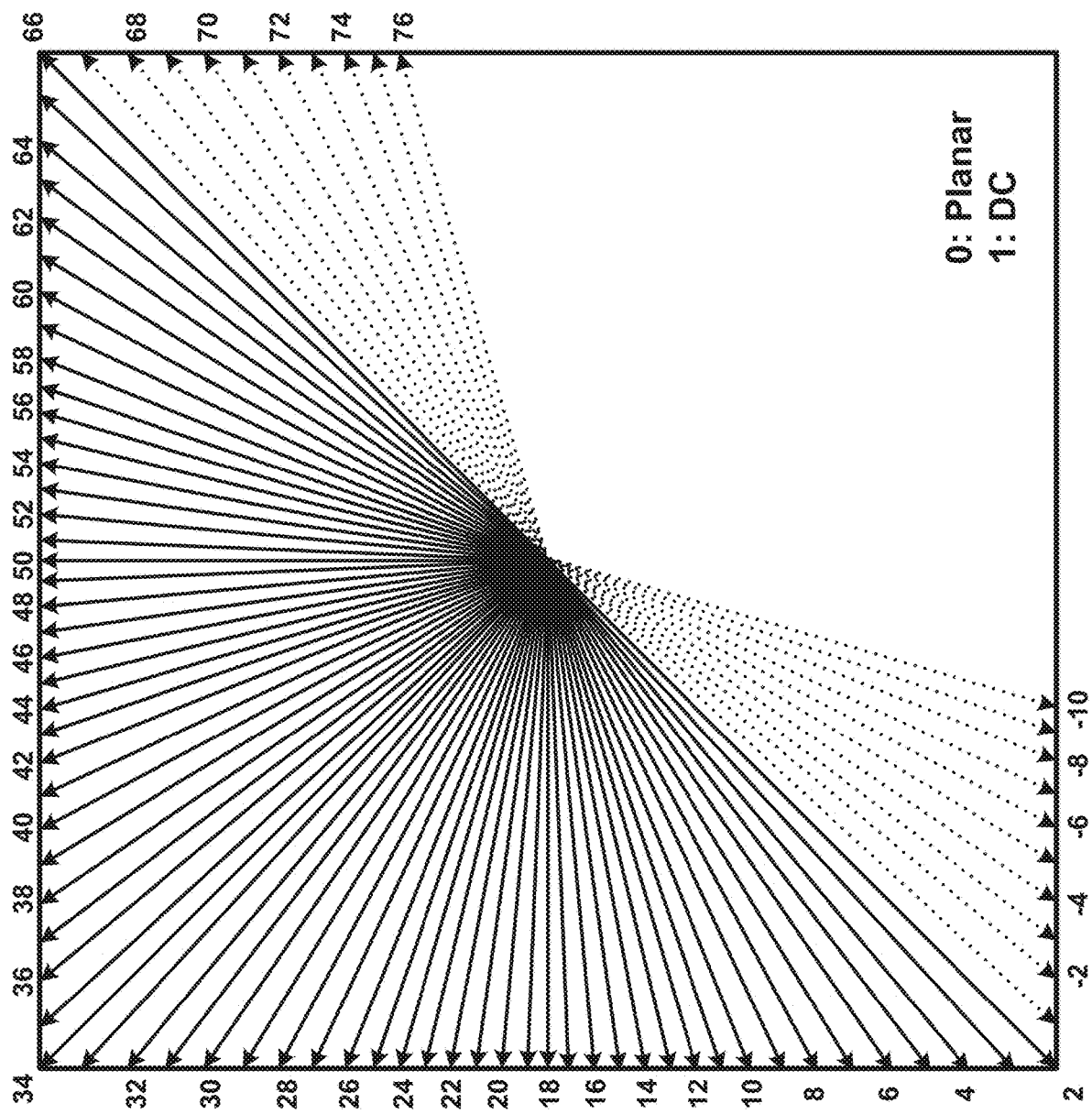
FIG. 4 is a conceptual diagram illustrating wide angles (−1 to −10, and 67 to 76) depicted in addition to the 65 angular modes.

In such rectangular blocks, restricting the direction of intra prediction to be within −135 degrees to 45 degrees can result in situations where farther reference samples are used rather than closer reference samples for intra prediction. Such a design is likely to have an impact on the coding efficiency; it is more beneficial to have the range of restrictions relaxed so that closer reference samples (beyond the −135 to 45-degree angle) can be used for prediction. An example of such a case is given in FIG. 3. FIG. 3 is a conceptual diagram of an example of 8×4 rectangular block where "closer" reference samples (upper right dashed circle 502) are not used, but farther reference samples (lower left dashed circle 504) may be used due to a restriction of an intra prediction direction to be in the range of −135 degrees to 45 degrees. FIG. 4 is an illustration of wide angles that are adopted in VTM2.

Figure 5A:
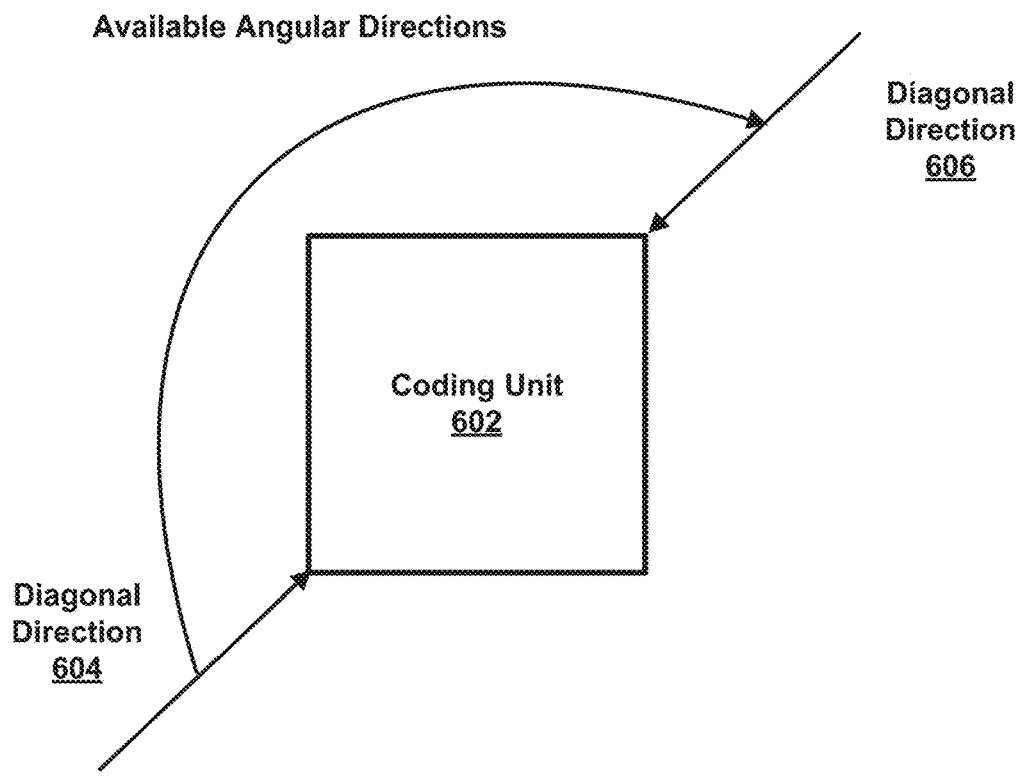
FIGS. 5A, 5B, and 5C are illustrations of mode mapping processes for intra prediction modes outside a diagonal direction range.
Figure 5B:
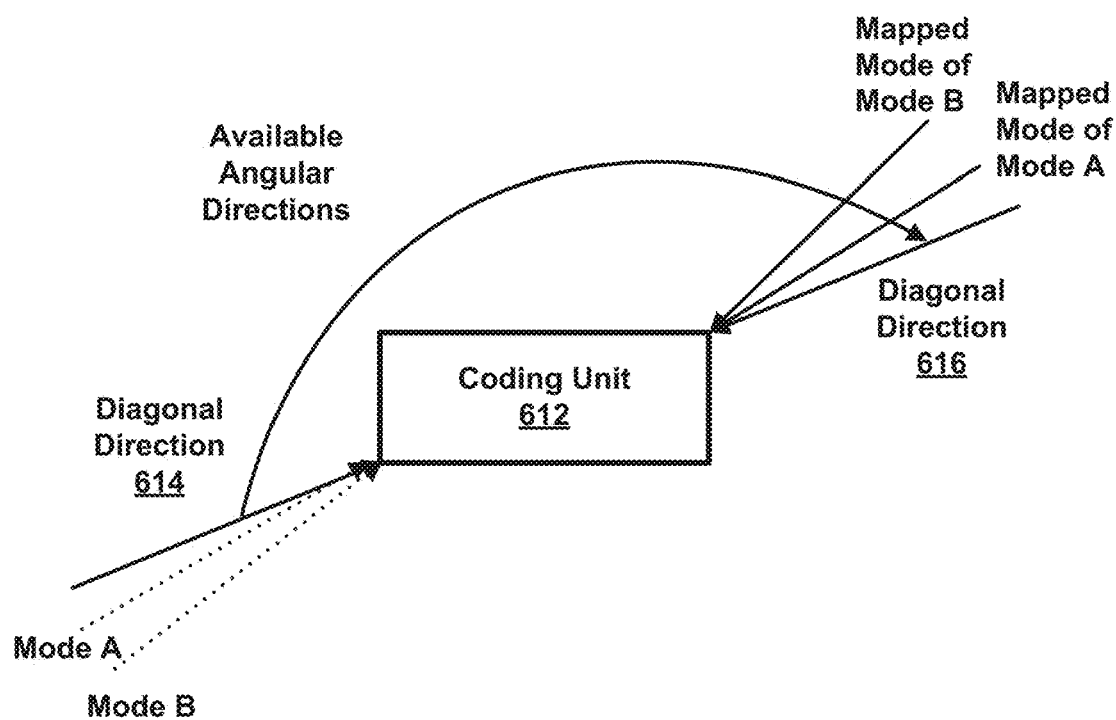
Figure 5C:
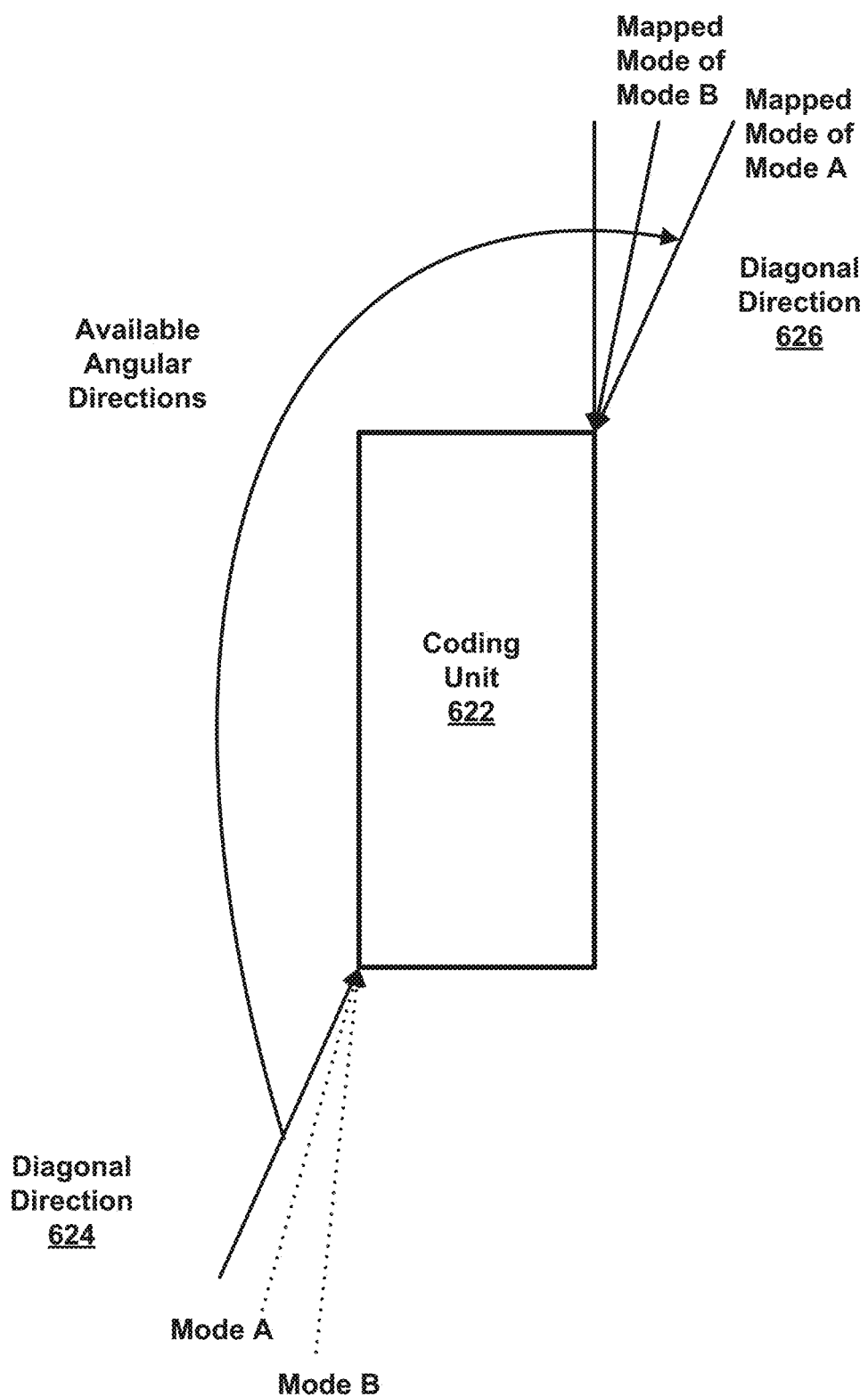

During the 12$^{th}$ JVET meeting, a modification of wide-angle intra prediction was adopted into VTM3 (See L. Zhao, X. Zhao, S. Liu, X. Li, "CE3-related: Unification of angular intra prediction for square and non-square blocks," 12$^{th}$ JVET Meeting, Macau SAR, CN, October 2018, JVET-L0279; J. Chen, Y. Ye, S. Kim, "Algorithm description for Versatile Video Coding and Test Model 3 (VTM3)," 12$^{th}$ JVET Meeting, Macau SAR, CN, October 2018, JVET-L1002; B. Bross, J. Chen, S. Liu, "Versatile Video Coding (Draft 3)," 12$^{th}$ JVET Meeting, Macau SAR, CN, October 2018, JVET-L1001). This adoption includes two modifications to unify the angular intra prediction for square and non-square blocks. Firstly, angular prediction directions are modified to cover diagonal directions of all block shapes. Secondly, all angular directions are kept within the range between the bottom-left diagonal direction and the top-right diagonal direction for all block aspect ratios (square and non-square) as illustrated in FIGS. 5A-5C. FIGS. 5A, 5B, and 5C are illustrations of mode mapping processes for intra prediction modes outside a diagonal direction range. FIG. 5A illustrates a square block that does not require angular mode remapping. FIG. 5B illustrates angular mode remapping for a horizontal non-square block. FIG. 5C illustrates angular mode remapping for a vertical non-square block.

Figure 6:
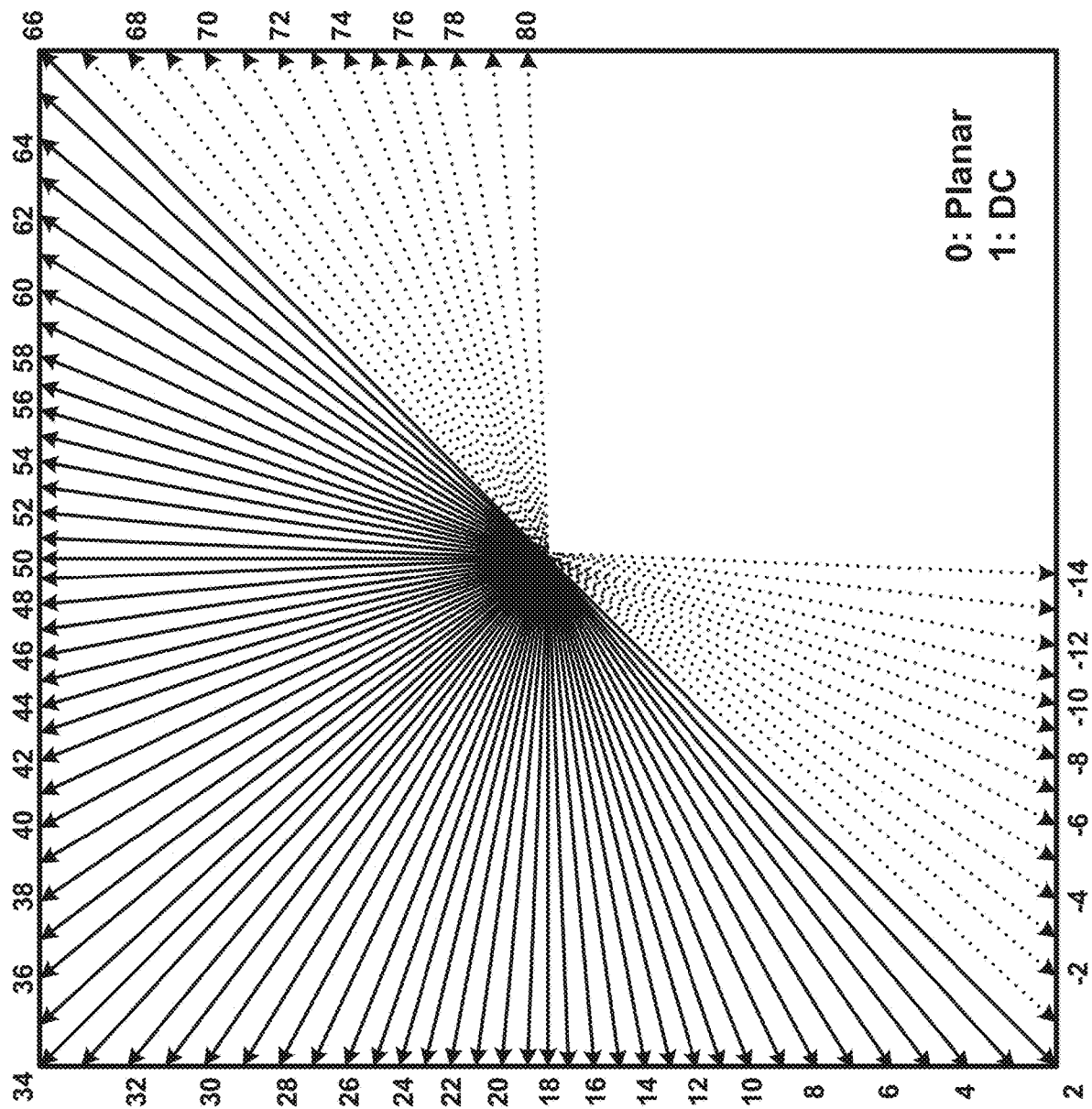
FIG. 6 is a conceptual diagram illustrating wide angles (−1 to −14, and 67 to 80) in VVC Test Model 3 (VTM3) beyond modes 2 and 66 for a total of 93 angular modes.

In addition, the number of reference samples in the top reference row and left reference column are restricted to 2*width+1 and 2*height+1 for all block shapes. An illustration of wider angles that are adopted in VTM3 is provided in FIG. 6. FIG. 6 is a conceptual diagram illustrating wide angles (−1 to −14, and 67 to 80) in VVC Test Model 3 (VTM3) beyond modes 2 and 66 for a total of 93 angular modes. Although VTM3 defines 95 modes, for any block size only 67 modes are allowed. The exact modes that are allowed depend on the ratio of block width to height. This is done by restricting the mode range for certain blocks sizes.

Table 1, shown in FIG. 7, specifies the mapping table between an intra prediction mode (predModeIntra) and the angle parameter intraPredAngle in VTM3 (JVET-L1001). The angular modes corresponding with non-square block diagonals are denoted with underlining. The vertical and horizontal modes are denoted with italics. Square block diagonal modes are denoted with underlining and italics. The diagonal modes for a block each has an angle equal to an angle for a line between the lower-left and top-right corners of the block or the top-left and bottom-right corners of the block. In this disclosure, angular modes with a positive intraPredAngle value are referred to as positive angular modes (mode index <18 or >50), while angular modes with a negative intraPredAngle value are referred to as negative angular modes (mode index >18 and <50).

The inverse angle parameter invAngle is derived based on intraPredAngle as follows:

$$invAngle = \text{Round}\left(\frac{256*32}{intraPredAngle}\right) \quad (2\text{-}1)$$

Note that intraPredAngle values that are multiples of 32 (0, 32, 64, 128, 256, 512) correspond with prediction from non-fractional reference array samples, as is the case in the VTM3 specification.

Table 2, below, shows diagonal modes (i.e., diagonal intra prediction modes) for blocks having various aspect ratios.

TABLE 2

Diagonal modes corresponding with various block aspect ratios.

| Block aspect ratio (width/height) | Diagonal modes |
|---|---|
| 1 (square) | 2, 34, 66 |
| 2 | 8, 28, 72 |
| 4 | 12, 24, 76 |
| 8 | 14, 22, 78 |
| 16 | 16, 20, 80 |
| ½ | −6, 40, 60 |
| ¼ | −10, 44, 56 |
| ⅛ | −12, 46, 54 |
| 1/16 | −14, 48, 52 |

Figure 8:
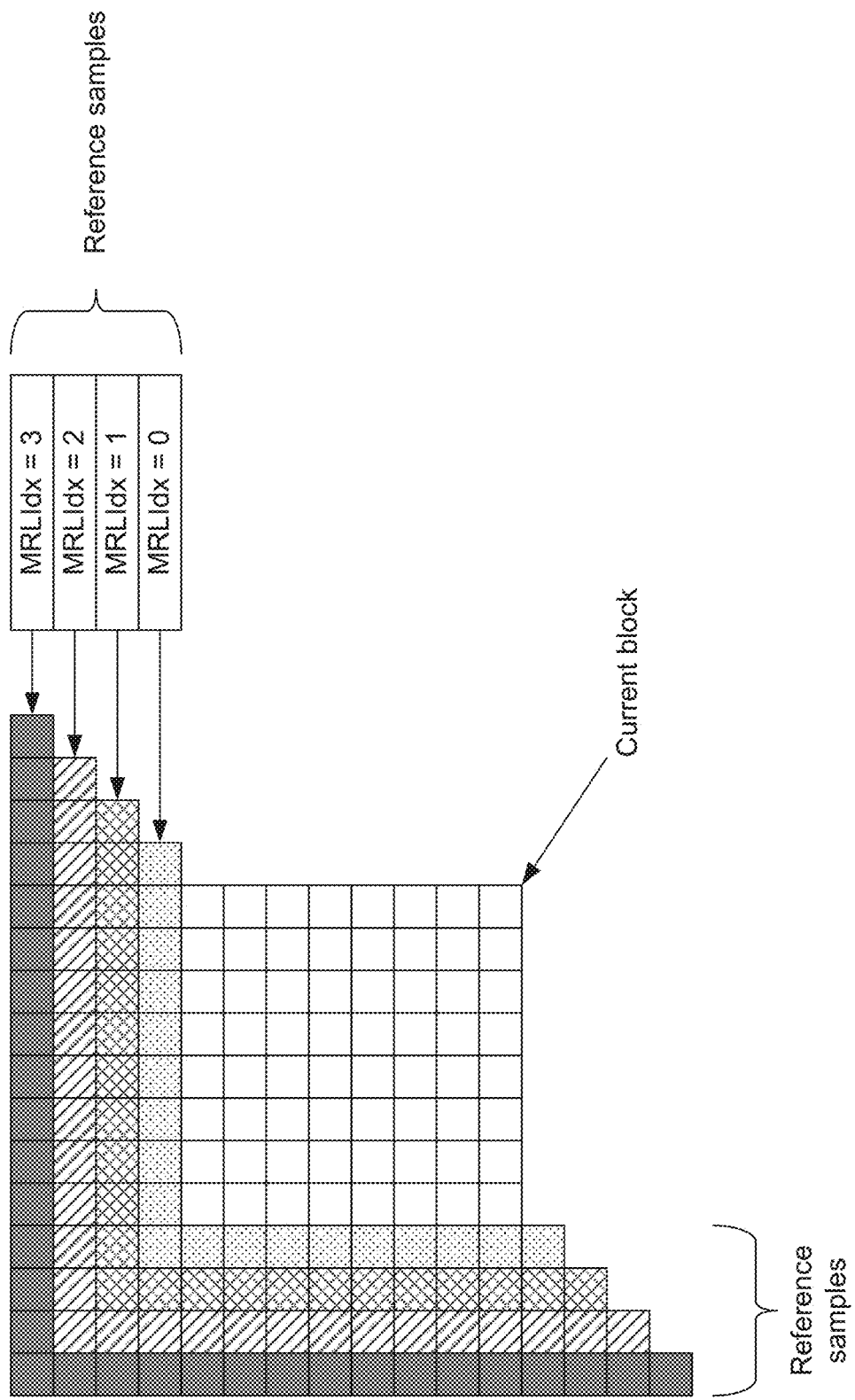
FIG. 8 is an illustration of reference samples from multiple reference lines that may be used for intra prediction of the coding block.

The samples in the neighborhood of a coding block are used for intra prediction of the block. Typically, the reconstructed reference sample lines that are closest to the left and the top boundaries of the coding block are used as the reference samples for intra prediction. However, VVC WD4 also enables other samples in the neighborhood of the coding block to be used as reference samples. FIG. 8 illustrates the reference sample lines that may be used for intra prediction. In the example of FIG. 8, reference sample lines are denoted using a multiple reference line index (MRLIdx). For each coding block, an index is signaled that indicates the reference line that is used.

The value of the signaled index may be different from the MRLIdx indicated by the signaled index. For instance, in VVC WD4, only reference lines with MRLIdx equal to 0, 1 and 3 can be used. In VVC WD4, the signaled index to the reference line used for coding the block (values 0, 1 and 2 indicating lines with MRLIdx 0, 1 and 3, respectively) is coded with a truncated unary codeword. Planar and DC modes are not used when MRLIdx>0. In a more recent version of VVC, MRLIdx equal to 0, 1 and 2 can be used, and DC modes may be used when MRLIdx>0.

To make the process of signaling intra prediction modes more efficient, video encoder 200 and video decoder 300 may identify one or more intra prediction modes as being "most probable modes" (MPMs) for a block. If the intra prediction mode of the block is one of the MPMs for the block, an index to the MPM is signaled. If the intra prediction mode of the block is not one of the MPMs for the block, an index to one of the non-MPM intra prediction modes for the block may be signaled. Because there are typically far fewer MPMs for a block than non-MPM intra prediction modes, the index to the MPM may be signaled using fewer bits than the index to a non-MPM intra prediction mode. The following text from VVC WD4 in an example of a process for determining an intra prediction mode that determines MPMs for a block.

Input to this process are:
a luma location (xCb, yCb) specifying the top-left sample of the current luma coding block relative to the top-left luma sample of the current picture,
a variable cbWidth specifying the width of the current coding block in luma samples,
a variable cbHeight specifying the height of the current coding block in luma samples.

In this process, the luma intra prediction mode IntraPredModeY[xCb][yCb] is derived.

Table 8-1 specifies the value for the intra prediction mode IntraPredModeY[xCb][yCb] and the associated names.

TABLE 8-1

Specification of intra prediction mode and associated names

| Intra prediction mode | Associated name |
|---|---|
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

NOTE-:
The intra prediction modes INTRA_LT_CCLM, INTRA_L_CCLM and INTRA_T_CCLM are only applicable to chroma components.

IntraPredModeY[xCb][yCb] is derived by the following ordered steps:

The neighbouring locations (xNbA, yNbA) and (xNbB, yNbB) are set equal to (xCb−1, yCb+cbHeight−1) and (xCb+cbWidth−1, yCb−1), respectively.

For X being replaced by either A or B, the variables candIntraPredModeX are derived as follows:

The availability derivation process for a block as specified in clause 6.4.X [Ed. (BB): Neighbouring blocks availability checking process tbd] is invoked with the location (xCurr, yCurr) set equal to (xCb, yCb) and the neighbouring location (xNbY, yNbY) set equal to (xNbX, yNbX) as inputs, and the output is assigned to availableX.

The candidate intra prediction mode candIntraPredModeX is derived as follows:

If one or more of the following conditions are true, candIntraPredModeX is set equal to INTRA_PLANAR.

The variable availableX is equal to FALSE.

CuPredMode[xNbX][yNbX] is not equal to MODE_INTRA and ciip_flag[xNbX][yNbX] is not equal to 1.

pcm_flag[xNbX][yNbX] is equal to 1.

X is equal to B and yCb−1 is less than ((yCb>>CtbLog2SizeY)<<CtbLog2SizeY).

Otherwise, candIntraPredModeX is set equal to IntraPredModeY[xNbX][yNbX].

The variables ispDefaultMode1 and ispDefaultMode2 are defined as follows:

If IntraSubPartitionsSplitType is equal to ISP_HOR_SPLIT, ispDefaultMode1 is set equal to INTRA_ANGULAR18 and ispDefaultMode2 is set equal to INTRA_ANGULAR5.

Otherwise, ispDefaultMode1 is set equal to INTRA_ANGULAR50 and ispDefaultMode2 is set equal to INTRA_ANGULAR63.

The candModeList[x] with x=0 . . . 5 is derived as follows:

If candIntraPredModeB is equal to candIntraPredModeA and candIntraPredModeA is greater than INTRA_DC, candModeList[x] with x=0 . . . 5 is derived as follows:

If IntraLumaRefLineIdx[xCb][yCb] is equal to 0 and IntraSubPartitionsSplitType is equal to ISP_NO_SPLIT, the following applies:

$$\text{candModeList}[0]=\text{candIntraPredMode}A \quad (8\text{-}8)$$

$$\text{candModeList}[1]=\text{INTRA\_PLANAR} \quad (8\text{-}9)$$

$$\text{candModeList}[2]=\text{INTRA\_DC} \quad (8\text{-}10)$$

$$\text{candModeList}[3]=2+((\text{candIntraPredMode}A+61)\%\,64) \quad (8\text{-}11)$$

$$\text{candModeList}[4]=2+((\text{candIntraPredMode}A+1)\%\,64) \quad (8\text{-}12)$$

$$\text{candModeList}[5]=2+((\text{candIntraPredMode}A+60)\%\,64) \quad (8\text{-}13)$$

Otherwise (IntraLumaRefLineIdx[xCb][yCb] is not equal to 0 or IntraSubPartitionsSplitType is not equal to ISP_NO_SPLIT), the following applies:

$$\text{candModeList}[0]=\text{candIntraPredMode}A \quad (8\text{-}14)$$

$$\text{candModeList}[1]=2+((\text{candIntraPredMode}A-+61)\%\,64) \quad (8\text{-}15)$$

$$\text{candModeList}[2]=2+((\text{candIntraPredMode}A-1)\%\,64) \quad (8\text{-}16)$$

If one of the following conditions is true,
IntraSubPartitionsSplitType is equal to ISP_HOR_PLIT and candIntraPredModeA is less than INTRA_ANGULAR34,
IntraSubPartitionsSplitType is equal to ISP_VER_SPLIT and candIntraPredModeA is greater than or equal to INTRA_ANGULAR34,
IntraLumaRefLineIdx[xCb][yCb] is not equal to 0,
the following applies:

$$\text{candModeList}[3]=2+((\text{candIntraPredMode}A+60)\%\,64) \quad (8\text{-}17)$$

$$\text{candModeList}[4]=2+(\text{candIntraPredMode}A\%\,64) \quad (8\text{-}18)$$

$$\text{candModeList}[5]=2+((\text{candIntraPredMode}A+59)\%\,64) \quad (8\text{-}19)$$

Otherwise, the following applies:

$$\text{candModeList}[3]=\text{ispDefaultMode1} \quad (8\text{-}20)$$

$$\text{candModeList}[4]=\text{ispDefaultMode2} \quad (8\text{-}21)$$

$$\text{candModeList}[5]=\text{INTRA\_PLANAR} \quad (8\text{-}22)$$

Otherwise if candIntraPredModeB is not equal to candIntraPredModeA and candIntraPredModeA or candIntraPredModeB is greater than INTRA_DC, the following applies:

The variables minAB and maxAB are derived as follows:

$$\min AB=\text{Min}(\text{candIntraPredMode}A,\text{candIntraPredMode}B) \quad (8\text{-}23)$$

$$\max AB=\text{Max}(\text{candIntraPredMode}A,\text{candIntraPredMode}B) \quad (8\text{-}24)$$

If candIntraPredModeA and candIntraPredModeB are both greater than INTRA_DC, candModeList[x] with x=0 . . . 5 is derived as follows:

$$\text{candModeList}[0]=\text{candIntraPredMode}A \quad (8\text{-}25)$$

$$\text{candModeList}[1]=\text{candIntraPredMode}B \quad (8\text{-}26)$$

If IntraLumaRefLineIdx[xCb][yCb] is equal to 0 and IntraSubPartitionsSplitType is equal to ISP_NO_SPLIT, the following applies:

$$\text{candModeList}[2]=\text{INTRA\_PLANAR} \quad (8\text{-}27)$$

$$\text{candModeList}[3]=\text{INTRA\_}DC \quad (8\text{-}28)$$

If maxAB−minAB is in the range of 2 to 62, inclusive, the following applies:

$$\text{candModeList}[4]=2+((\max AB+61)\%\,64) \quad (8\text{-}29)$$

$$\text{candModeList}[5]=2+((\max AB-1)\%\,64) \quad (8\text{-}30)$$

Otherwise, the following applies:

$$\text{candModeList}[4]=2+((\max AB+60)\%\,64) \quad (8\text{-}31)$$

$$\text{candModeList}[5]=2+((\max AB)\%\,64) \quad (8\text{-}32)$$

Otherwise (IntraLumaRefLineIdx[xCb][yCb] is not equal to 0 or IntraSubPartitionsSplitType is not equal to ISP_NO_SPLIT), the following applies:

When IntraSubPartitionsSplitType is not equal to ISP_NO_SPLIT, and abs(candIntraPredModeB−ispDefault-Mode1) is less than abs(candIntraPredModeA−ispDefault-Mode1), the following applies:

candModeList[0]=candIntraPredMode$B$  (8-33)

candModeList[1]=candIntraPredMode$A$  (8-34)

If maxAB−minAB is equal to 1, the following applies:

candModeList[2]=2+((min$AB$+61)% 64)  (8-35)

candModeList[3]=2+((max$AB$−1)% 64)  (8-36)

candModeList[4]=2+((min$AB$+60)% 64)  (8-37)

candModeList[5]=2+(max$AB$% 64)  (8-38)

Otherwise if maxAB−minAB is equal to 2, the following applies:

candModeList[2]=2+((min$AB$−1)% 64)  (8-39)

candModeList[3]=2+((min$AB$+61)% 64)  (8-40)

candModeList[4]=2+((max$AB$−1)% 64)  (8-41)

candModeList[5]=2+((min$AB$+60)% 64)  (8-42)

Otherwise if maxAB−minAB is greater than 61, the following applies:

candModeList[2]=2+((min$AB$−1)% 64)  (8-43)

candModeList[3]=2+((max$AB$+61)% 64)  (8-44)

candModeList[4]=2+(min$AB$% 64)  (8-45)

candModeList[5]=2+((max$AB$+60)% 64)  (8-46)

Otherwise, the following applies:

candModeList[2]=2+((min$AB$+61)% 64)  (8-47)

candModeList[3]=2+((min$AB$−1)% 64)  (8-48)

candModeList[4]=2+((max$AB$+61)% 64)  (8-49)

candModeList[5]=2+((max$AB$−1)% 64)  (8-50)

Otherwise (candIntraPredModeA or candIntraPredModeB is greater than INTRA_DC), candModeList[x] with x=0 . . . 5 is derived as follows:

If IntraLumaRefLineIdx[xCb][yCb] is equal to 0 and IntraSubPartitionsSplitType is equal to ISP_NO_SPLIT, the following applies:

candModeList[0]=candIntraPredMode$A$  (8-51)

candModeList[1]=candIntraPredMode$B$  (8-52)

candModeList[2]=1−min$AB$  (8-53)

candModeList[3]=2+((max$AB$+61)% 64)  (8-54)

candModeList[4]=2+((max$AB$−1)% 64)  (8-55)

candModeList[5]=2+((max$AB$+60)% 64)  (8-56)

Otherwise, if IntraLumaRefLineIdx[xCb][yCb] is not equal to 0, the following applies:

candModeList[0]=max$AB$  (8-57)

candModeList[1]=2+((max$AB$+61)% 64)  (8-58)

candModeList[2]=2+((max$AB$−1)% 64)  (8-59)

candModeList[3]=2+((max$AB$+60)% 64)  (8-60)

candModeList[4]=2+(max$AB$% 64)  (8-61)

candModeList[5]=2+((max$AB$+59)% 64)  (8-62)

Otherwise (IntraSubPartitionsSplitType is not equal to ISP_NO_SPLIT), the following applies:

candModeList[0]=INTRA_PLANAR  (8-63)

candModeList[1]=max$AB$  (8-64)

candModeList[2]=2+((max$AB$+61)% 64)  (8-65)

candModeList[3]=2+((max$AB$−1)% 64)  (8-66)

candModeList[4]=2+((max$AB$+60)% 64)  (8-67)

candModeList[5]=2+(max$AB$% 64)  (8-68)

Otherwise, the following applies:

If IntraLumaRefLineIdx[xCb][yCb] is equal to 0 and IntraSubPartitionsSplitType is equal to ISP_NO_SPLIT, the following applies:

candModeList[0]=candIntraPredMode$A$  (8-69)

candModeList[1]=(candModeList[0]==INTRA_PLANAR)?INTRA_$DC$:INTRA_PLANAR  (8-70)

candModeList[2]=INTRA_ANGULAR50  (8-71)

candModeList[3]=INTRA_ANGULAR18  (8-72)

candModeList[4]=INTRA_ANGULAR46  (8-73)

candModeList[5]=INTRA_ANGULAR54  (8-74)

Otherwise, if IntraLumaRefLineIdx[xCb][yCb] is not equal to 0, the following applies:

candModeList[0]=INTRA_ANGULAR50  (8-75)

candModeList[1]=INTRA_ANGULAR18  (8-76)

candModeList[2]=INTRA_ANGULAR2  (8-77)

candModeList[3]=INTRA_ANGULAR34  (8-78)

candModeList[4]=INTRA_ANGULAR66  (8-79)

candModeList[5]=INTRA_ANGULAR26  (8-80)

Otherwise, if IntraSubPartitionsSplitType is equal to ISP_HOR_SPLIT, the following applies:

candModeList[0]=INTRA_PLANAR  (8-81)

candModeList[1]=INTRA_ANGULAR18  (8-82)

candModeList[2]=INTRA_ANGULAR25  (8-83)

candModeList[3]=INTRA_ANGULAR10  (8-84)

candModeList[4]=INTRA_ANGULAR65  (8-85)

candModeList[5]=INTRA_ANGULAR50  (8-86)

Otherwise, if IntraSubPartitionsSplitType is equal to ISP_VER_SPLIT, the following applies:

candModeList[0]=INTRA_PLANAR  (8-87)

candModeList[1]=INTRA_ANGULAR50  (8-88)

candModeList[2]=INTRA_ANGULAR43  (8-89)

candModeList[3]=INTRA_ANGULAR60  (8-90)

candModeList[4]=INTRA_ANGULAR3  (8-91)

candModeList[5]=INTRA_ANGULAR18  (8-92)

IntraPredModeY[xCb][yCb] is derived by applying the following procedure:

If intra_luma_mpm_flag[xCb][yCb] is equal to 1, the IntraPredModeY[xCb][yCb] is set equal to candModeList [intra_luma_mpm_idx[xCb][yCb]].

Otherwise, IntraPredModeY[xCb][yCb] is derived by applying the following ordered steps:

When candModeList[i] is greater than candModeList[j] for i=0 . . . 4 and for each i, j=(i+1) . . . 5, both values are swapped as follows:

(candModeList[$i$],candModeList[$j$])=Swap(candModeList[$i$],candModeList[$j$])  (8-93)

IntraPredModeY[xCb][yCb] is derived by the following ordered steps:

IntraPredModeY[xCb][yCb] is set equal to intra_luma_mpm_remainder[xCb][yCb].

For i equal to 0 to 5, inclusive, when IntraPredModeY [xCb][yCb] is greater than or equal to candModeList[i], the value of IntraPredModeY[xCb][yCb] is incremented by one.

The variable IntraPredModeY[x][y] with x=xCb . . . xCb+cbWidth−1 and y=yCb . . . yCb+cbHeight−1 is set to be equal to IntraPredModeY[xCb][yCb].

Figure 9:
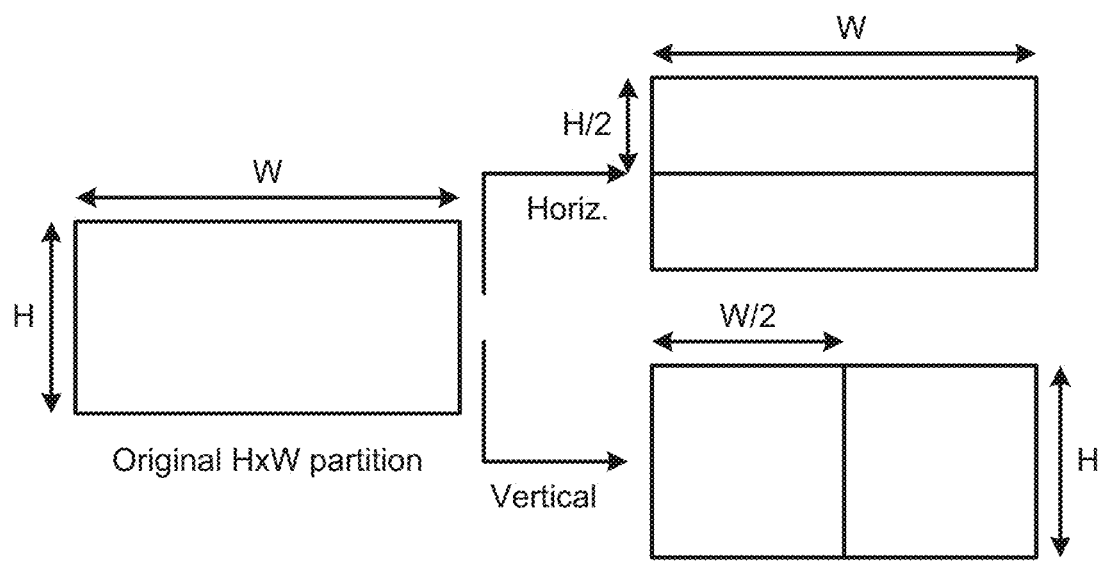
FIG. 9 is a conceptual diagram illustrating an example of division of 4×8 and 8×4 blocks.
Figure 10:
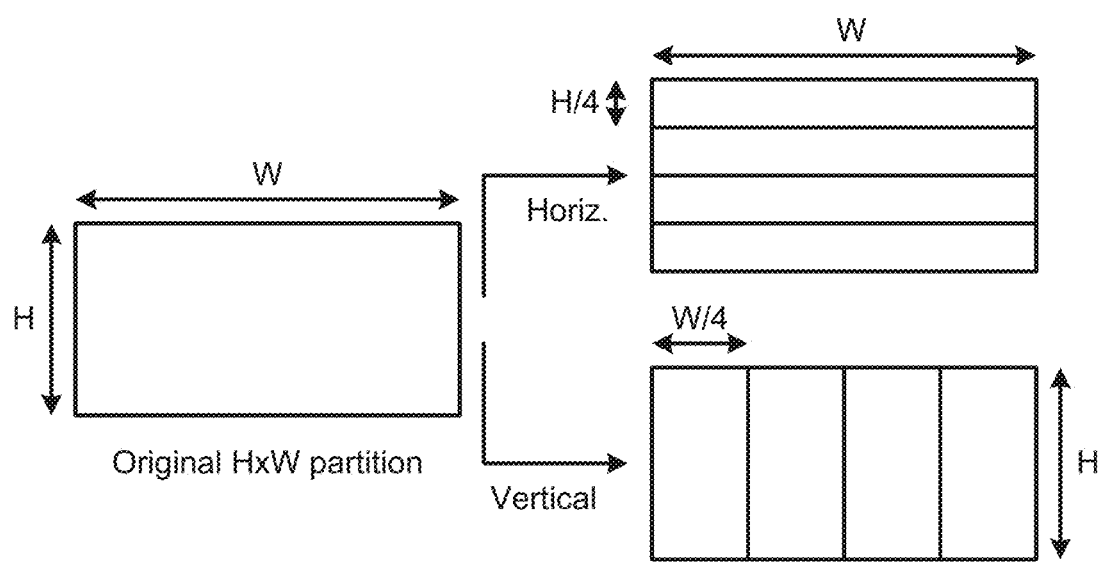
FIG. 10 is a conceptual diagram illustrating an example of division of all blocks except 4×8, 8×4, and 4×4.

Intra sub-partition coding (ISP) (see S. De Luxán Hernández, V. George, J. Ma, T. Nguyen, H. Schwarz, D. Marpe, T. Wiegand (HHI), "CE3: Intra Sub-Partitions Coding Mode," JVET-M0102) is a method by which a coding block is split into two or four subblocks. Each subblock within a block is reconstructed in decoding order before the reconstruction of the subsequent subblock in decoding order. In VVC WD4, ISP is only applied to luma coding blocks. The reference samples for ISP-coded blocks are restricted to be from the reference line that is closest to the coding block (e.g., MRLIdx=0 as shown in FIG. 8). Examples of splitting are shown in FIG. 9 and FIG. 10.

One bit is used to signal whether a coding block is split into ISPs and a second bit is used to indicate the split type: horizontal or vertical. Based on the intra mode and the split type used, two different classes of processing orders may be used, which are referred to as normal and reversed order. In the normal order, the first sub-partition to be processed is the one containing the top-left sample of the CU and then continuing downwards (horizontal split) or rightwards (vertical split). On the other hand, the reverse processing order either starts with the sub-partition containing the bottom-left sample of the CU (horizontal split) and continues upwards or starts with sub-partition containing the top-right sample of the CU and continues leftwards (vertical split).

A variation of ISP that uses only the normal processing order is used in JVET WD4. It is to be noted that the terms subblock and sub-partitions are used interchangeably in this document, and both refer to the blocks obtained by partitioning a coding block using ISP.

Some syntax and semantics associated with ISP in JVET WD4 are shown below, with relevant syntax is enclosed in tags <!> . . . </!>

Syntax Table of Coding Unit

| | Descriptor |
|---|---|
| coding_unit( x0, y0, cbWidth, cbHeight, treeType) { | |
| ... | |
|   } else { | |
|     if( treeType == SINGLE_TREE \|\| treeType == DUAL_TREE_LUMA ) { | |
|       if( ( y0 % CtbSizeY ) > 0 ) | |
|         intra_luma_ref_idx[ x0 ][ y0 ] | ae(v) |
| <!> if (intra_luma_ref_idx[ x0 ][ y0 ] == 0 && | |
|         ( cbWidth <= MaxTbSizeY \|\| cbHeight <= MaxTbSizeY ) && | |
|         ( cbWidth * cbHeight > MinTbSizeY * MinTbSizeY )) | |
|         intra_subpartitions_mode_flag[ x0 ][ y0 ] | ae(v) |
|       if( intra_subpartitions_mode_flag[ x0 ][ y0 ] == 1 && | |
|         cbWidth <= MaxTbSizeY && cbHeight <= MaxTbSizeY ) | |
|         intra_subpartitions_split_flag[ x0 ][ y0 ] | ae(v)</!> |
|       if( intra_luma_ref_idx[ x0 ][ y0 ] == 0 && | |
|         intra_subpartitions_mode_flag[ x0 ][ y0 ] == 0 ) | |
|         intra_luma_mpm_flag[ x0 ][ y0 ] | ae(v) |
|       if( intra_luma_mpm_flag[ x0 ][ y0 ] ) | |
|         intra_luma_mpm_idx[ x0 ][ y0 ] | ae(v) |
| ... | |

Syntax Table of Transform Tree

| | Descriptor |
|---|---|
| transform_tree( x0, y0, tbWidth, tbHeight , treeType) { | |
| <!> InferTuCbfLuma = 1 | |

|  | Descriptor |
|---|---|

```
    if( IntraSubPartSplitType == NO_ISP_SPLIT ) {<!>
      if( tbWidth > MaxTbSizeY || tbHeight > MaxTbSizeY ) {
        trafoWidth = ( tbWidth > MaxTbSizeY) ? (tbWidth / 2) :
tbWidth
        trafoHeight = ( tbHeight > MaxTbSizeY) ? (tbHeight / 2) :
tbHeight
        transform_tree( x0, y0, trafoWidth, trafoHeight )
        if( tbWidth > MaxTbSizeY )
    transform_tree( x0 + trafoWidth, y0, trafoWidth, trafoHeight,
treeType )
        if( tbHeight > MaxTbSizeY )
    transform_tree( x0, y0 + trafoHeight, trafoWidth, trafoHeight,
treeType )
        if( tbWidth > MaxTbSizeY && tbHeight > MaxTbSizeY )
    transform_tree( x0 + trafoWidth, y0 + trafoHeight, trafoWidth,
trafoHeight, treeType )
      } else {
        transform_unit( x0, y0, tbWidth, tbHeight, treeType, 0 )
      }
<!> } else if( IntraSubPartitionsSplitType == ISP_HOR_SPLIT ) {
      trafoHeight = tbHeight / NumIntraSubPartitions
      for( partIdx = 0; partIdx < NumIntraSubPartitions; partIdx++ )
        transform_unit( x0, y0 + trafoHeight * partIdx, tbWidth,
      trafoHeight, treeType, partIdx )
    } else if( IntraSubPartitionsSplitType == ISP_VER_SPLIT ) {
      trafoWidth = tbWidth / NumIntraSubPartitions
      for( partIdx = 0; partIdx < NumIntraSubPartitions; partIdx++ )
        transform_unit( x0 + trafoWidth * partIdx, y0, trafoWidth,
      tbHeight, treeType, partIdx )
    }</!>
}
```

Semantics of Coding Unit

<!>intra_subpartitions_mode_flag[x0][y0] equal to 1 specifies that the current intra coding unit is partitioned into NumIntraSubPartitions[x0][y0] rectangular transform block subpartitions. intra_subpartitions_mode_flag[x0][y0] equal to 0 specifies that the current intra coding unit is not partitioned into rectangular transform block subpartitions. When intra_subpartitions_mode_flag[x0][y0] is not present, it is inferred to be equal to 0.

intra_subpartitions_split_flag[x0][y0] specifies whether the intra subpartitions split type is horizontal or vertical. When intra_subpartitions_mode_flag[x0][y0] is not present, it is inferred to be equal to 0. The variable IntraSubPartitionsSplitType specifies the type of split used for the current luma coding block as illustrated in Table 2-3. IntraSubPartitionsSplitType is derived as follows:

If intra_subpartitions_mode_flag[x0][y0] is equal to 0, IntraSubPartitionsSplitType is set equal to 0.

Otherwise, the IntraSubPartitionsSplitType is set equal to 1+intra_subpartitions_split_flag[x0][y0].

TABLE 2-3

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions an intra luma coding block is divided into. NumIntraSubPartitions is derived as follows:

If IntraSubPartitionsSplitType is equal to ISP_NO_SPLIT, NumIntraSubPartitions is set equal to 1.

Otherwise, if one of the following conditions is true, NumIntraSubPartitions is set equal to 2:

cbWidth is equal to 4 and cbHeight is equal to 8, cbWidth is equal to 8 and cbHeight is equal to 4.

Otherwise, NumIntraSubPartitions is set equal to 4.</!>

Affine linear weighted intra prediction (ALWIP) (e.g., as described in J. Pfaff et al., "Affine linear weighted intra prediction (CE3-4.1, CE3-4.2)", Joint Video Experts Team (JVET) of ITU-T SG 16 WP 3 and ISO/IEC JTC 1/SC 29/WG 11, 14th Meeting: Geneva, CH, 19-27 Mar. 2019, document JVET-N0217 (hereinafter "JVET-N0217")) generates a prediction of a block (i.e., a prediction block) from the neighboring reference samples using an affine linear weighted prediction model. The neighboring samples are first processed (e.g., in some cases, neighboring samples are down-sampled) and the processed (e.g., down-sampled) samples are then used to derive (using an affine model) a set of reduced samples which resembles an intermediate down-sampled version of the predicted samples. A final prediction is obtained by up-sampling (as necessary) the intermediate values. Note that ALWIP may also be referred to as matrix intra prediction (MIP).

Figure 11:
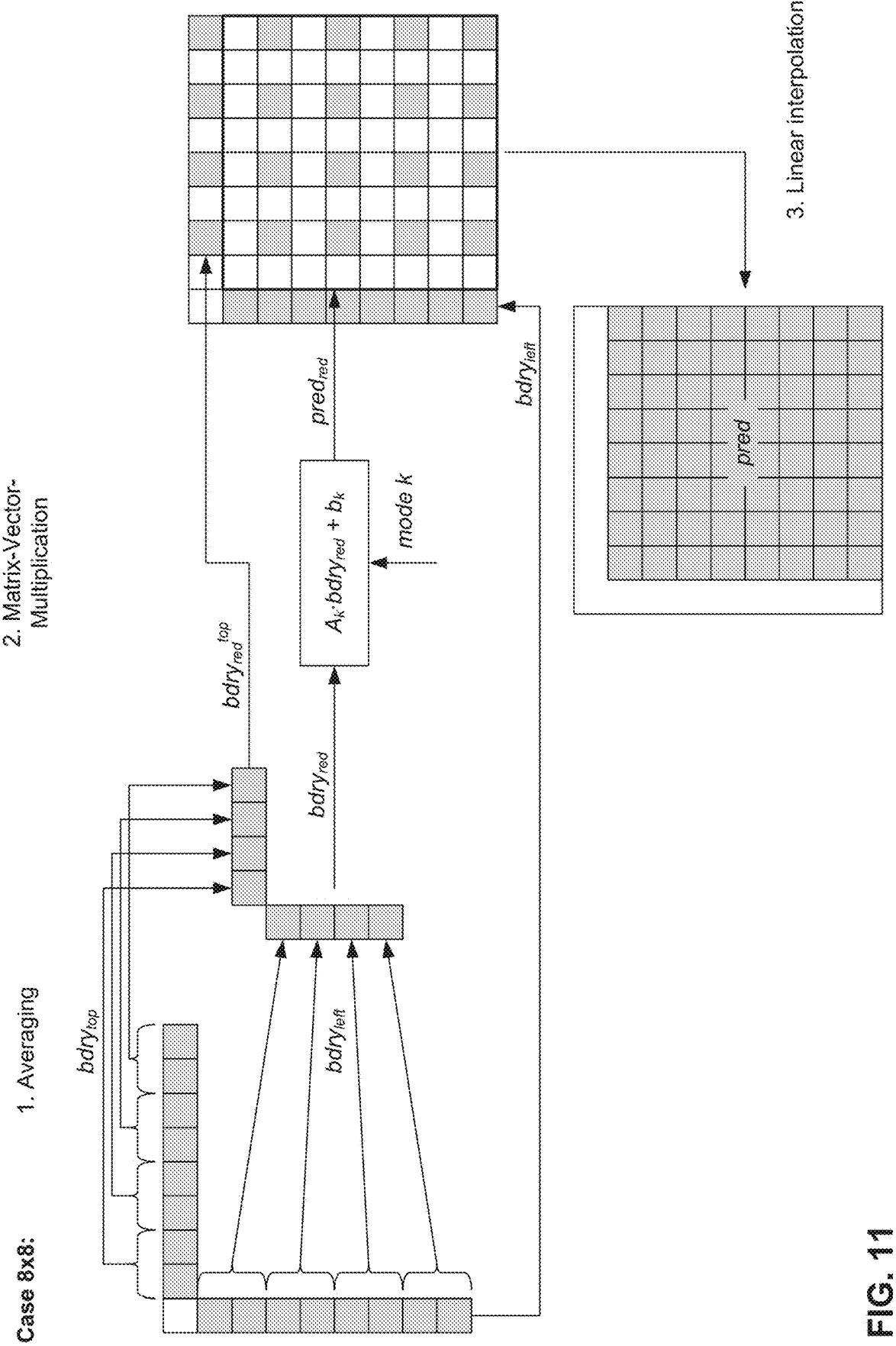
FIG. 11 is a conceptual diagram illustrating an example of an affine linear weighted intra prediction (ALWIP) process on 8×8 block.

An illustration of the ALWIP process is given in FIG. 11. The ALWIP process of FIG. 11 may be performed by video encoder 200 and video decoder 300. The reference samples of the block (also referred to as boundary samples) are down-sampled to obtain reduced boundary samples. The vector representation of the boundary samples, $bdry_{red}$, is multiplied with a matrix $A_k$ and an offset/bias term $b_k$ is added to obtain a down-sampled version of the predicted block, $pred_{red}$. The final prediction is obtained by up-sampling these predicted samples $pred_{red}$ along with the boundary samples. The matrix $A_k$ and an offset/bias vector $b_k$ are chosen based on a mode value indicated for the block. A combination of a matrix $A_k$ and an offset/bias vector $b_k$ may be referred to herein as an "ALWIP mode."

The derivation of intermediate predicted samples uses an affine linear weighted prediction model. Three types (i.e., ALWIP types) are defined, and the number of the intermediate samples derived differ for each type as follows:

1) 4×4 for block sizes of width and height both equal to 4. In other words, there are 16 intermediate samples for blocks having sizes of 4×4.
2) 8×8 for block sizes of width and height both less than equal to 8 except when both width and height are equal to 4 (i.e., 4×8, 8×4 and 8×8 blocks). In other words, there are 64 intermediate samples for blocks having sizes of H×W, where 4<H≤8 and 4<W≤8, or H=4 and 4<W≤8, or W=4 and 4<H≤8
3) 16×16 for blocks where at least one of width and height is greater than 8. In other words, there are 256 intermediate samples for blocks having sizes of H×W, there either H>8 or W>8.

In each of these three cases, different numbers of ALWIP modes are used: 35, 19, and 11, respectively. In other words, for ALWIP type 1, there are 35 different available ALWIP modes; for ALWIP type 2, there are 19 different available ALWIP modes; and for ALWIP type 3, there are 11 different ALWIP modes available. Each of the different ALWIP modes may correspond to a different combination of a matrix $A_k$ and an offset/bias value $b_k$.

The signaling of the ALWIP includes:
a) A flag (alwip_flag) to indicate that the current block is coded with ALWIP.
b) When the current block is coded with ALWIP, another flag is signaled to indicate whether the current block is coded with an ALWIP-most probable mode (MPM) mode or not.
   a. If the block is coded with an ALWIP-MPM mode, an MPM index is signaled. Derivation of the ALWIP-MPM mode is described in this disclosure below.
   b. Else, an index to a remaining mode value is signaled. The remaining mode value indicates an ALWIP mode other than the ALWIP-MPM mode.

The alwip_flag is context coded with four contexts allowed:
If block width>2*height or height>2*width, context 3 is used.
Else, context ctxId is used, where ctxId is derived as follows:
Initialize ctxId to 0.
If the left neighboring block is coded with ALWIP, ctxId++ (i.e., increment ctxId).
If the above neighboring block is coded with ALWIP, ctxId++.

The derivation of the ALWIP MPM modes involves the following steps:
1) LeftIntraMode and AboveIntraMode are initialized to −1.
2) If the left neighboring block is intra coded:
   a. If the left neighboring block is coded with ALWIP mode L (i.e., if the left neighboring block is coded with ALWIP, let the ALWIP mode of the left neighboring block be denoted as L):
      i. If L is of the same ALWIP type as the current block, then LeftIntraMode is set equal to L.
   b. Otherwise, if the left neighboring block is not coded with an ALWIP mode, the intra mode of the left neighboring block is mapped to an ALWIP mode of the same type as the current block and assigned to LeftIntraMode.
3) If the above neighboring block is intra coded:
   a. If the above neighboring block is coded with ALWIP mode A (i.e., if the above neighboring block is coded with ALWIP, let the ALWIP mode of the above neighboring block be denoted as A):
      i. If A is of the same ALWIP type as the current block, then AboveIntraMode is set equal to A.
   b. Otherwise, if the above neighboring block is not coded with an ALWIP mode, the intra mode of the above neighboring block is mapped to an ALWIP mode of the same type as the current block and assigned to AboveIntraMode.
4) The MPMs are then derived based on LeftIntraMode and AboveIntraMode. In other words, a first ALWIP-MPM is set equal to LeftIntraMode and a second ALWIP-MPM is set equal to AboveIntraMode. If LeftIntraMode remains equal to −1 or AboveIntraMode remains equal to −1, the corresponding MPMs are unavailable.

In the rest of the document, blocks coded with ALWIP may be referred to as ALWIP-coded blocks or ALWIP blocks; other blocks (e.g., blocks coded with regular intra prediction, intra sub-partitions, or multiple reference lines) may be referred to as non-ALWIP blocks.

There are several problems in the design of ALWIP (i.e., MIP). For example, the context derivation of the flag indicating whether a current block is coded using ALWIP mode (e.g., alwip_flag) uses the alwip_flag values from left and above neighboring blocks. The value of an alwip_flag of the above neighboring block is used even when the above neighboring block belongs to a different CTU row. This creates additional storage requirements. For instance, if r refers to the CTU boundary between the current CTU row and the previous CTU row, the alwip_flag of all the blocks from the previous CTU row that shares a boundary r need to be stored. In a worst-case scenario of 4×4 blocks in a 4K picture, the number of bytes required would be 3840/4 (number of blocks)×1 (bits per flag value)=120 bytes. Providing storage for the alwip_flag values of all the blocks from the previous CTU row increases memory storage requirements of video encoder 200 and video decoder 300, thereby potentially increasing the cost and complexity of video encoder 200 and video decoder 300.

Figure 12:
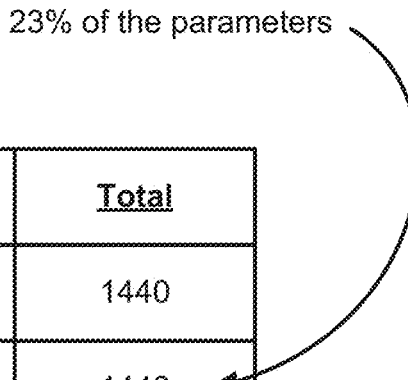
FIG. 12 is a table illustrating the number of matrix parameters and offset parameters for each ALWIP type in Versatile Video Coding Working Draft 4 (VVC WD4).

In another example of a problem with the design of ALWIP, there are 35 matrices/modes specified for 4×4 blocks. These 35 matrices/modes represent nearly 25% of the parameters needed for ALWIP. The compression efficiency when enabling ALWIP 4×4 blocks is nearly 0.05% and storage required around 2 KB (to store the 35 matrices and offset/bias vectors). Thus, the storage burden on encoder/decoder implementations is undue for the efficiency obtained. FIG. 12 is a table illustrating the number of matrix parameters and offset parameters for each ALWIP type in VVC WD4.

During the most-probable mode (MPM) derivation of non-ALWIP blocks, the intra mode used for the left and above neighboring blocks are checked and used when available. For instance, when deriving the ALWIP MPM modes, a video coder (e.g., video encoder 200 and video decoder 300) determines whether the left neighboring block is available and, if so, the video coder determines whether the left neighboring block is intra coded and, if so, the video coder determines whether or not the left neighboring block is coded using an ALWIP mode. Similarly, the video coder also determines whether the above neighboring block is available and, if so, the video coder determines whether the above neighboring block is intra coded and, if so, the video coder determines whether or not the above neighboring block is coded using an ALWIP mode. For non-ALWIP blocks (i.e., blocks not coded using an ALWIP mode), mode values correspond to angular intra prediction modes or Planar/DC intra prediction modes. Except in trivial cases, one set of matrix coefficients (e.g., a set of matrix coefficients for an ALWIP mode) used in ALWIP may not correspond to any of the intra modes used in non-ALWIP blocks. ALWIP currently uses a first mapping table to approximate the mapping of the ALWIP matrix to one of the intra modes. This approximated value is then considered as the intra mode of the neighboring block to be used in the MPM derivation of the non-ALWIP block. In other words, when a left neighboring block is coded using a non-ALWIP intra prediction mode, a video coder (e.g., video encoder 200 or video decoder 300) sets a first ALWIP-MPM to the approximated value for the left neighboring block. Similarly, when an above neighboring block is coded using a non-ALWIP intra prediction mode, the video coder sets a second ALWIP-MPM to the approximated value for the above neighboring block. This may result in inefficient compression, e.g., because of error in the approximation. Moreover, the mapping table requires additional storage and adds lookup operations in the MPM derivation process. The additional storage adds to the cost and complexity of video encoder 200 and video decoder 300. The additional lookup operations may slow down the encoding and decoding processes.

This problem may also apply to the chroma Direct Mode (DM) mode, where the intra mode used for the chroma block is copied from a collocated intra block. When the collocated intra block is ALWIP coded, the first mapping table is used to derive the chroma DM mode from the ALWIP block matrix/mode. In other words, a luma block collocated with a chroma block may be coded using an ALWIP mode but the chroma block cannot be coded using any ALWIP mode. Thus, if the chroma block is to be coded using the chroma DM mode in which the intra prediction mode of the luma block is inherited by the chroma block, it may be necessary for a video coder (e.g., video encoder 200 or video decoder 300) to convert from the ALWIP mode of the luma block to a non-ALWIP intra prediction mode for use in the chroma block. This conversion is an approximation that may reduce coding efficiency. Furthermore, this conversion may require additional storage for a mapping table and may add lookup operations, which may increase the cost and complexity of the video coder and may slow the encoding and decoding processes.

Similar to the examples in the previous paragraphs, during the MPM derivation of an ALWIP block, intra modes from the left and above neighboring blocks are checked and used when available. When the neighboring block is a non-ALWIP block, the intra mode of the non-ALWIP block may not correspond to the matrices/modes used by the ALWIP block. In other words, different ALWIP modes available for use with a current block depending on the size of the current block and the intra mode of an above or left neighboring block of the current block may not correspond to any of the ALWIP modes available for use with the current block. Hence, a second mapping table is used to map the intra mode of the non-ALWIP block to the matrix/mode of the ALWIP block. This may result in inefficiency in compression. Moreover, the second mapping table requires additional storage and adds lookup operations in the MPM derivation process. If a neighboring block is coded with combined intra/inter mode (CIIP), the neighboring block is considered (e.g., by video encoder 200 and video decoder 300) as a non-intra-coded mode and is marked as unavailable. If a neighboring block is coded with intra block copy mode (IBC), the block is considered as a non-intra-coded mode and is marked as unavailable.

This disclosure describes techniques that may improve the design of ALWIP mode. The techniques of this disclosure may reduce the cost and complexity of video coders, such as video encoder 200 and video decoder 300, and may increase the speed of encoding and decoding processes. The techniques and examples of this disclosure may be used by video encoder 200 and video decoder 300 individually or in any combination.

In accordance with a first technique of this disclosure, when an above neighboring block belongs to a different CTU than a current block (i.e., a block that a video coder (e.g., video encoder 200 or video decoder 300) is currently coding), the above neighboring block is considered to be unavailable for the purpose of derivation of the context for an alwip_flag. For example, a derivation process of the context for alwip_flag may be modified as follows, with <!> . . . </!> tags indicating additions:

The alwip_flag is context coded with four contexts allowed:

If block width>2*height or height>2*width, context 3 is used.

Else, context ctxId is used, where ctxId is derived as follows:

Initialize ctxId to 0

If the left neighboring block is coded with ALWIP, ctxId++.

If the above neighboring block is coded with ALWIP <!> and the above neighboring block is in the same CTU as the current block</!>, ctxId++

Thus, in this example, video encoder 200 and video decoder 300 may avoid the need to store data indicating whether blocks in a CTU row above a CTU row containing the current block are coded using an ALWIP mode. Avoiding the need to store such data may reduce the cost and complexity of video encoder 200 and video decoder 300.

In some examples, the value of an alwip_flag from an above CTU row may be inferred to be equal to a particular value (e.g., 0) for purposes deriving the context of alwip_flag for the current block. In other words, video encoder 200 and video decoder 300 may assume that the alwip_flag values for above neighboring blocks that are in an above CTU row all have the same particular value. In this way, video encoder 200 and video decoder 300 may avoid the need to store data indicating whether the blocks in the CTU row above the CTU row containing the current block are coded using an ALWIP mode, with the resulting potential reductions of cost and complexity for video encoder 200 and video decoder 300.

Thus, in accordance with an example of the first technique of this disclosure, a video coder (e.g., video encoder 200 or video decoder 300) may determine a context for an ALWIP syntax element (e.g., alwip_flag). In this example, the ALWIP syntax element indicates whether a current block is coded with ALWIP. Furthermore, in this example, an above neighbor block is determined to be unavailable for determining the context based on the above neighbor block being in a different CTU from the current block, the above neighbor block being an above neighbor of the current block. In this example, the video coder may code the ALWIP syntax element based on the context. For instance, the video coder may use the context in CABAC coding of the ALWIP syntax element.

In accordance with a second technique of this disclosure, a constraint is introduced to disable ALWIP for blocks less than a particular threshold of width, $w_T$, and height, $h_T$. In other words, a video coding standard (e.g., VVC, etc.) may impose a constraint that disables ALWIP for blocks that have a width less than a threshold width or a height less than a threshold height. Thus, a video coding standard may specify that blocks having widths less than $w_T$ and heights less than $h_T$ cannot be coded using ALWIP. For example, the constraint may provide that ALWIP is disabled for blocks with widths less than 8 and heights less than 8. In some examples, ALWIP-related syntax elements are conditioned based on such block size restrictions. As noted above, e.g., with respect to FIG. 12, the coding of small blocks with ALWIP may result in high storage requirements but relatively modest gains in coding efficiency. Introducing this constraint may reduce the number of parameters that video encoder 200 and video decoder 300 may need to store to implement ALWIP, thereby potentially reducing complexity and cost of video encoder 200 and video decoder 300. Thus, in accordance with the second technique of this disclosure, a constraint may be imposed that disables ALWIP for blocks that have widths less than a threshold width (e.g., 8) or heights less than a threshold height (e.g., 8).

In accordance with a third technique of this disclosure, when an ALWIP-coded neighboring block is considered/tested in the MPM derivation of a non-ALWIP coded block, the neighboring block may be considered unavailable (or inter-coded) and/or the value of the intra mode of such a neighboring block may be inferred to be a particular value (e.g., planar mode, DC mode, or another intra prediction mode) for the MPM derivation of the non-ALWIP coded block. For ease of explanation, this disclosure may refer to the particular value as a default value. In this way, video encoder 200 and video decoder 300 may avoid the need to store a mapping table to map ALWIP modes to non-ALWIP-intra prediction modes and may avoid lookup operations into the mapping table. This may reduce the storage requirements of video encoder 200 and video decoder 300, which may reduce the cost and complexity of video encoder 200 and video decoder 300.

Thus, in accordance with the third technique of this disclosure, a video coder (e.g., video encoder 200 or video decoder 300) may perform an MPM derivation process that derives one or more MPMs for a current block that is not coded using ALWIP. As part of performing the MPM derivation process, the video coder may determine whether a neighboring block of the current block is an ALWIP-coded neighboring block. Based on the neighboring block being an ALWIP-coded neighboring block, the video coder may determine that a value of an intra prediction mode of the neighboring block is a default value. The video coder may then include an intra prediction mode corresponding to the default value as one of the one or more MPMs. If the neighboring block is not ALWIP-coded, the video coder may determine that the one or more MPMs include the intra prediction mode of the neighboring block. The video coder may code (e.g., encode or decode) the current block based on one of the MPMs for the current block or based on another intra prediction mode.

Furthermore, in some examples, when a chroma block is coded with the DM mode (i.e., the intra prediction mode of the chroma block is inherited from a collocated luma block) and the collocated luma block (or more particularly, a luma block used to derive the DM mode of the chroma block) is coded with ALWIP, the intra mode of the collocated block may be determined, e.g., inferred, to be a default value (e.g., Planar). In this way, video encoder 200 and video decoder 300 may avoid the need to store a mapping table to map ALWIP modes to non-ALWIP-intra prediction modes and may avoid lookup operations into the mapping table. This may reduce the storage requirements of video encoder 200 and video decoder 300, which may reduce the cost and complexity of video encoder 200 and video decoder 300.

Thus, in some examples where a chroma block is coded with a DM mode, a video coder (e.g., video encoder 200 or video decoder 300) may determine whether a collocated luma block is coded with ALWIP, where the collocated luma block is collocated with the chroma block. Based on the collocated luma block being coded with ALWIP, the video coder may determine, e.g., infer, that an intra prediction mode of the collocated luma block is a default value (e.g., planar mode), such as the planar mode or another intra prediction mode. The video coder may code (e.g., encode or decode) the chroma block using an intra prediction mode corresponding to the default value. For instance, to encode the chroma block using the intra prediction mode corresponding to the default value, video encoder 200 may generate a prediction block using the intra prediction mode. Video encoder 200 may then generate residual data for the chroma block based on samples of the chroma block and the prediction block. To decode the chroma block using the intra prediction mode corresponding to the default value, video decoder 300 may generate a prediction block using the intra prediction mode. Video decoder 300 may then reconstruct the chroma block based on the prediction block and residual data for the chroma block.

In accordance with a fourth technique of this disclosure, when a non-ALWIP neighboring block is used in the MPM derivation of an ALWIP block, the neighboring block may be considered unavailable (or inter-coded) and/or the neighboring mode value may be assigned to a default value for the MPM derivation of the ALWIP block. In other words, when determining ALWIP-MPMs for an ALWIP-coded block and a neighboring block is not coded using ALWIP, video encoder 200 and video decoder 300 may consider the neighboring block to be unavailable or may assume that the neighboring block has a default intra prediction mode. This may avoid or reduce the need for video encoder 200 and video decoder 300 to store mapping data to convert non-ALWIP directional intra prediction modes to ALWIP modes. Avoiding or reducing the need to store such mapping data may reduce the cost and complexity of video encoder 200 and video decoder 300.

In some examples, if a neighboring block is coded with combined intra/inter mode (CIIP), the neighboring block may be considered as available and assigned the planar mode, or another appropriate non-ALWIP mode, for the MPM derivation of the ALWIP block. Alternatively, the CIIP mode may be mapped directly to an appropriate ALWIP mode to optimize coding efficiency benefits. The assignment may depend on block dimensions, etc. If the neighboring block is coded with intra block copy mode (IBC), the block may be considered as available and assigned the planar mode, or other appropriate non-ALWIP mode, for the MPM derivation of the ALWIP block. Alternatively, the IBC mode may be mapped directly to an appropriate ALWIP mode to optimize coding efficiency benefits. The assignment may depend on block dimensions, etc. Mapping CIIP modes and IBC modes directly (e.g., in a 1-to-1 relationship) to a particular mode, such as the planar mode, may avoid or reduce the need to store more complex mapping data. Avoiding or reducing the need to store more complex mapping data may reduce the cost and complexity of video encoder 200 and video decoder 300.

In accordance with a fifth technique of this disclosure, a constraint may be introduced to disable ALWIP for blocks with width-to-height ratio of 4 or 0.25. In other words, a video coding standard may provide that a block having a width-to-height ratio of 4 or 0.25 may not be coded using ALWIP. Not coding blocks having such width-to-height ratios may reduce the number of ALWIP parameters that video encoder 200 and video decoder 300 may need to store, thereby potentially reducing the cost and complexity of video encoder 200 and video decoder 300.

Figure 13:
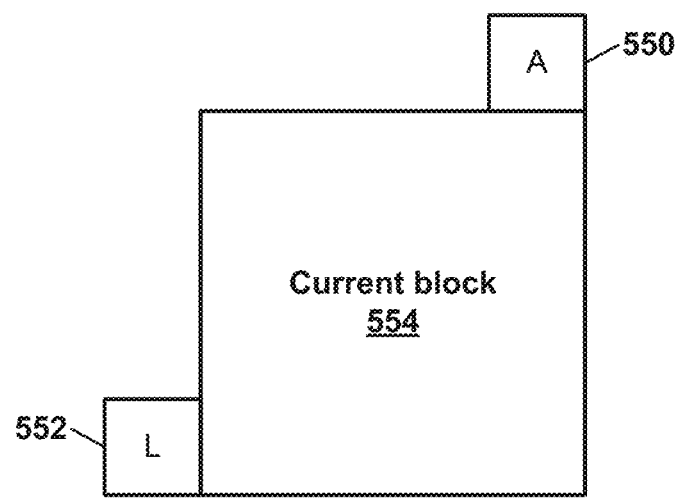
FIG. 13 is a conceptual diagram illustrating example neighboring blocks used to derive ALWIP most probable modes (MPMs) for a current block, in accordance with one or more techniques of this disclosure.

The MPM list derivation for ALWIP uses the modes from neighboring blocks that are adjacent to the top-right (e.g., just above the top-right sample) and/or bottom-left samples (e.g., just left of the bottom-left sample) of the current block. In some examples, the neighbor location used to derive the MPMs for ALWIP is aligned with the neighbor location used to derive the MPMs for regular intra prediction. More generally, any one or more blocks in the neighborhood of the current block may be used for the MPM derivation for ALWIP. FIG. 13 is a conceptual diagram illustrating example neighboring blocks 550, 552 used to derive ALWIP MPMs for a current block 554, in accordance with one or more techniques of this disclosure. In the example of FIG. 13, block A (550) is a block (top-) adjacent to the top-right sample of current block 554. Block L (552) is a block (left-) adjacent to the bottom-left sample of current block 554.

The following specification text from JVET-N0217 is edited to implement the techniques described with respect to the fourth technique of this disclosure. Changes are indicated by tags <!> . . . </!>.

Assigning Mode to CIIP Coded Block for MPM Derivation of ALWIP Block

Derivation Process for Affine Linear Weighted Intra Prediction Mode

Input to this process are:
a luma location (xCb, yCb) specifying the top-left sample of the current luma coding block relative to the top-left luma sample of the current picture,
a variable cbWidth specifying the width of the current coding block in luma samples,
a variable cbHeight specifying the height of the current coding block in luma samples.

In this process, the affine linear weighted intra prediction mode IntraPredModeY[xCb][yCb] is derived.

IntraPredModeY[xCb][yCb] is derived by the following ordered steps:
1. The neighboring locations (xNbA, yNbA) and (xNbB, yNbB) are set equal to (xCb−1, yCb) and (xCb, yCb−1), respectively.
2. For X being replaced by either A or B, the variables candLwipModeX are derived as follows:
The availability derivation process for a block as specified in clause 6.4.X [Ed. (BB): Neighboring blocks availability checking process tbd] is invoked with the location (xCurr, yCurr) set equal to (xCb, yCb) and the neighboring location (xNbY, yNbY) set equal to (xNbX, yNbX) as inputs, and the output is assigned to availableX.
The candidate affine linear weighted intra prediction mode candLwipModeX is derived as follows:
If one or more of the following conditions are true, candLwipModeX is set equal to −1.
The variable availableX is equal to FALSE.
CuPredMode[xNbX][yNbX] is not equal to MODE_INTRA and ciip_flag[xNbX][yNbX] is not equal to 1.
pcm_flag[xNbX][yNbX] is equal to 1.
X is equal to B and yCb−1 is less than ((yCb>>CtbLog2SizeY)<<CtbLog2SizeY).
Otherwise, the following applies:
The size type derivation process for a block as specified in clause 8.4.X.1 is invoked with the width of the current coding block in luma samples cbWidth and the height of the current coding block in luma samples cbHeight as input, and the output is assigned to variable sizeId.
If intra_lwip_flag[xNbX][yNbX] is equal to 1, the size type derivation process for a block as specified in clause 8.4.X.1 is invoked with the width of the neighboring coding block in luma samples nbWidthX and the height of the neighboring coding block in luma samples nbHeightX as input, and the output is assigned to variable sizeIdX.
If sizeId is equal to sizeIdX, candLwipModeX is set equal to IntraPredModeY[xNbX][yNbX].
Otherwise, candLwipModeX is set equal to −1.
<!> Otherwise, if intra_lwip_flag[xNbX][yNbX] is equal to 0 and ciip_flag ciip_flag[xNbX][yNbX] is equal to 1,
IntraPredModeY[xNbX][yNbX] is set equal to INTRA_PLANAR and candLwipModeX is derived using
IntraPredModeY[xNbX][yNbX] and sizeId as specified in Table 8-X1.</!>
Otherwise, candLwipModeX is derived using IntraPredModeY[xNbX][yNbX] and sizeId as specified in Table 8-X1.
3. The candLwipModeList[x] with x=0 . . . 2 is derived as follows, using lwipMpmCand[sizeId] as specified in Table 8-X2:
If candLwipModeA and candLwipModeB are both equal to −1, the following applies:

$$\text{cand}L\text{wipModeList}[0]=l\text{wipMpmCand}[\text{sizeId}][0] \quad (8\text{-}X1)$$

$$\text{cand}L\text{wipModeList}[1]=l\text{wipMpmCand}[\text{sizeId}][1] \quad (8\text{-}X2)$$

$$\text{cand}L\text{wipModeList}[2]=l\text{wipMpmCand}[\text{sizeId}][2] \quad (8\text{-}X3)$$

Otherwise, the following applies:
If candLwipModeA is equal to candLwipModeB or if either candLwipModeA or candLwipModeB is equal to −1, the following applies:

$$\text{cand}L\text{wipModeList}[0]=(\text{cand}L\text{wipMode}A!=-1)?\text{cand}L\text{wipMode}A:\text{cand}L\text{wipMode}B \quad (8\text{-}X4)$$

If candLwipModeList[0] is equal to lwipMpmCand[sizeId][0], the following applies:

$$\text{cand}L\text{wipModeList}[1]=l\text{wipMpmCand}[\text{sizeId}][1] \quad (8\text{-}X5)$$

$$\text{cand}L\text{wipModeList}[2]=l\text{wipMpmCand}[\text{sizeId}][2] \quad (8\text{-}X6)$$

Otherwise, the following applies:

$$\text{cand}L\text{wipModeList}[1]=l\text{wipMpmCand}[\text{sizeId}][0] \quad (8\text{-}X7)$$

$$\text{cand}L\text{wipModeList}[2]=(\text{cand}L\text{wipModeList}[0]!=l\text{wipMpmCand}[\text{sizeId}][1])?l\text{wipMpmCand}[\text{sizeId}][1]:l\text{wipMpmCand}[\text{sizeId}][2] \quad (8\text{-}X8)$$

Otherwise, the following applies:

$$\text{cand}L\text{wipModeList}[0]=\text{cand}L\text{wipMode}A \quad (8\text{-}X9)$$

$$\text{cand}L\text{wipModeList}[1]=\text{cand}L\text{wipMode}B \quad (8\text{-}X10)$$

If candLwipModeA and candLwipModeB are both not equal to lwipMpmCand[sizeId][0], the following applies:

$$\text{cand}L\text{wipModeList}[2]=l\text{wipMpmCand}[\text{sizeId}][0] \quad (8\text{-}X11)$$

Otherwise, the following applies:
If candLwipModeA and candLwipModeB are both not equal to lwipMpmCand[sizeId][1], the following applies:

cand*L*wipModeList[2]=*l*wipMpmCand[sizeId][1]     (8-X12)

Otherwise, the following applies:

cand*L*wipModeList[2]=*l*wipMpmCand[sizeId][2]     (8-X13)

4. IntraPredModeY[xCb][yCb] is derived by applying the following procedure:
If intra_lwip_mpm_flag[xCb][yCb] is equal to 1, the IntraPredModeY[xCb][yCb] is set equal to candLwipModeList[intra_lwip_mpm_idx[xCb][yCb]].
Otherwise, IntraPredModeY[xCb][yCb] is derived by applying the following ordered steps:
1. When candLwipModeList[i] is greater than candLwipModeList[j] for i=0 . . . 1 and for each i, j=(i+1) . . . 2, both values are swapped as follows:

(cand*L*wipModeList[*i*],cand*L*wipModeList[*j*])=Swap
    (cand*L*wipModeList[*i*],cand*L*wipModeList[*j*])     (8-X14)

2. IntraPredModeY[xCb][yCb] is derived by the following ordered steps:
  i. IntraPredModeY[xCb][yCb] is set equal to intra_lwip_mpm_remainder[xCb][yCb].
  ii. For i equal to 0 to 2, inclusive, when IntraPredModeY[xCb][yCb] is greater than or equal to candLwipModeList[i], the value of IntraPredModeY[xCb][yCb] is incremented by one.

The variable IntraPredModeY[x][y] with x=xCb . . . xCb+cbWidth−1 and y=yCb . . . yCb+cbHeight−1 is set to be equal to IntraPredModeY[xCb][yCb].

8.4.X.1 Derivation Process for Prediction Block Size Type
Input to this process are:
a variable cbWidth specifying the width of the current coding block in luma samples,
a variable cbHeight specifying the height of the current coding block in luma samples.
Output of this process is a variable sizeId.
The variable sizeId is derived as follows:
If both cbWidth and cbHeight are equal to 4, sizeId is set equal to 0.
Otherwise, if both cbWidth and cbHeight are less than or equal to 8, sizeId is set equal to 1.
Otherwise, sizeId is set equal to 2.

TABLE 8-X1

Specification of mapping between intra prediction and affine linear weighted intra prediction modes

| IntraPredModeY [xNbX][yNbX] | block size type sizeId | | |
|---|---|---|---|
| | 0 | 1 | 2 |
| 0 | 17 | 0 | 5 |
| 1 | 17 | 0 | 1 |
| 2, 3 | 17 | 10 | 3 |
| 4, 5 | 9 | 10 | 3 |
| 6, 7 | 9 | 10 | 3 |
| 8, 9 | 9 | 10 | 3 |
| 10, 11 | 9 | 10 | 0 |
| 12, 13 | 17 | 4 | 0 |
| 14, 15 | 17 | 6 | 0 |
| 16, 17 | 17 | 7 | 4 |
| 18, 19 | 17 | 7 | 4 |
| 20, 21 | 17 | 7 | 4 |
| 22, 23 | 17 | 5 | 5 |
| 24, 25 | 17 | 5 | 1 |
| 26, 27 | 5 | 0 | 1 |

TABLE 8-X1-continued

Specification of mapping between intra prediction and affine linear weighted intra prediction modes

| IntraPredModeY [xNbX][yNbX] | block size type sizeId | | |
|---|---|---|---|
| | 0 | 1 | 2 |
| 28, 29 | 5 | 0 | 1 |
| 30, 31 | 5 | 3 | 1 |
| 32, 33 | 5 | 3 | 1 |
| 34, 35 | 34 | 12 | 6 |
| 36, 37 | 22 | 12 | 6 |
| 38, 39 | 22 | 12 | 6 |
| 40, 41 | 22 | 12 | 6 |
| 42, 43 | 22 | 14 | 6 |
| 44, 45 | 34 | 14 | 10 |
| 46, 47 | 34 | 14 | 10 |
| 48, 49 | 34 | 16 | 9 |
| 50, 51 | 34 | 16 | 9 |
| 52, 53 | 34 | 16 | 9 |
| 54, 55 | 34 | 15 | 9 |
| 56, 57 | 34 | 13 | 9 |
| 58, 59 | 26 | 1 | 8 |
| 60, 61 | 26 | 1 | 8 |
| 62, 63 | 26 | 1 | 8 |
| 64, 65 | 26 | 1 | 8 |
| 66 | 26 | 1 | 8 |

TABLE 8-X2

Specification of affine linear weighted intra prediction candidate modes

| | candidate mode | | |
|---|---|---|---|
| | 0 | 1 | 2 |
| lwipMpmCand[0] | 17 | 34 | 5 |
| lwipMpmCand[1] | 0 | 7 | 16 |
| lwipMpmCand[2] | 1 | 4 | 6 |

Example changes to the specification text of JVET-N0217 to implement the fifth technique of this disclosure are denoted with <!> . . . </!> tags below.

Derivation Process for Affine Linear Weighted Intra Prediction Mode
Input to this process are:
a luma location (xCb, yCb) specifying the top-left sample of the current luma coding block relative to the top-left luma sample of the current picture,
a variable cbWidth specifying the width of the current coding block in luma samples,
a variable cbHeight specifying the height of the current coding block in luma samples.
In this process, the affine linear weighted intra prediction mode IntraPredModeY[xCb][yCb] is derived.
IntraPredModeY[xCb][yCb] is derived by the following ordered steps:
1. The neighboring locations (xNbA, yNbA) and (xNbB, yNbB) are set equal to (xCb−1, yCb<!>+cbHeight−1</!>) and (xCb<!>+cbWidth−1<!>, yCb−1), respectively.
2. For X being replaced by either A or B, the variables candLwipModeX are derived as follows:
The availability derivation process for a block as specified in clause 6.4.X [Ed. (BB): Neighboring blocks availability checking process tbd] is invoked with the location (xCurr, yCurr) set equal to (xCb, yCb) and the neighboring location (xNbY, yNbY) set equal to (xNbX, yNbX) as inputs, and the output is assigned to availableX.
The candidate affine linear weighted intra prediction mode candLwipModeX is derived as follows:

If one or more of the following conditions are true, candLwipModeX is set equal to −1.
The variable availableX is equal to FALSE.
CuPredMode[xNbX][yNbX] is not equal to MODE_INTRA and ciip_flag[xNbX][yNbX] is not equal to 1.
pcm_flag[xNbX][yNbX] is equal to 1.
X is equal to B and yCb−1 is less than ((yCb>>CtbLog2SizeY)<<CtbLog2SizeY).
Otherwise, the following applies:
The size type derivation process for a block as specified in clause 8.4.X.1 is invoked with the width of the current coding block in luma samples cbWidth and the height of the current coding block in luma samples cbHeight as input, and the output is assigned to variable sizeId.
If intra_lwip_flag[xNbX][yNbX] is equal to 1, the size type derivation process for a block as specified in clause 8.4.X.1 is invoked with the width of the neighboring coding block in luma samples nbWidthX and the height of the neighboring coding block in luma samples nbHeightX as input, and the output is assigned to variable sizeIdX.
If sizeId is equal to sizeIdX, candLwipModeX is set equal to IntraPredModeY[xNbX][yNbX].
Otherwise, candLwipModeX is set equal to −1.
Otherwise, candLwipModeX is derived using IntraPredModeY[xNbX][yNbX] and sizeId as specified in Table 8-X1.
3. The candLwipModeList[x] with x=0 . . . 2 is derived as follows, using lwipMpmCand[sizeId] as specified in Table 8-X2:
If candLwipModeA and candLwipModeB are both equal to −1, the following applies:

candLwipModeList[0]=lwipMpmCand[sizeId][0]     (8-X1)

candLwipModeList[1]=lwipMpmCand[sizeId][1]     (8-X2)

candLwipModeList[2]=lwipMpmCand[sizeId][2]     (8-X3)

Otherwise, the following applies:
If candLwipModeA is equal to candLwipModeB or if either candLwipModeA or candLwipModeB is equal to −1, the following applies:

candLwipModeList[0]=(candLwipModeA !=−1)?candLwipModeA:candLwipModeB     (8-X4)

If candLwipModeList[0] is equal to lwipMpmCand[sizeId][0], the following applies:

candLwipModeList[1]=lwipMpmCand[sizeId][1]     (8-X5)

candLwipModeList[2]=lwipMpmCand[sizeId][2]     (8-X6)

Otherwise, the following applies:

candLwipModeList[1]=lwipMpmCand[sizeId][0]     (8-X7)

candLwipModeList[2]=(candLwipModeList[0] !=lwipMpmCand[sizeId][1])?lwipMpmCand[sizeId][1]:lwipMpmCand[sizeId][2]     (8-X8)

Otherwise, the following applies:

candLwipModeList[0]=candLwipModeA     (8-X9)

candLwipModeList[1]=candLwipModeB     (8-X10)

If candLwipModeA and candLwipModeB are both not equal to lwipMpmCand[sizeId][ ], the following applies:

candLwipModeList[2]=lwipMpmCand[sizeId][0]     (8-X11)

Otherwise, the following applies:
If candLwipModeA and candLwipModeB are both not equal to lwipMpmCand[sizeId][1], the following applies:

candLwipModeList[2]=lwipMpmCand[sizeId][1]     (8-X12)

Otherwise, the following applies:

candLwipModeList[2]=lwipMpmCand[sizeId][2]     (8-X13)

4. IntraPredModeY[xCb][yCb] is derived by applying the following procedure:
If intra_lwip_mpm_flag[xCb][yCb] is equal to 1, the IntraPredModeY[xCb][yCb] is set equal to candLwipModeList[intra_lwip_mpm_idx[xCb][yCb]].
Otherwise, IntraPredModeY[xCb][yCb] is derived by applying the following ordered steps:
1. When candLwipModeList[i] is greater than candLwipModeList[j] for i=0 . . . 1 and for each i, j=(i+1) . . . 2, both values are swapped as follows:

(candLwipModeList[i],candLwipModeList[j])=Swap (candLwipModeList[i],candLwipModeList[j])     (8-X14)

2. IntraPredModeY[xCb][yCb] is derived by the following ordered steps:
i. IntraPredModeY[xCb][yCb] is set equal to intra_lwip_mpm_remainder[xCb][yCb].
ii. For i equal to 0 to 2, inclusive, when IntraPredModeY[xCb][yCb] is greater than or equal to candLwipModeList[i], the value of IntraPredModeY[xCb][yCb] is incremented by one.
The variable IntraPredModeY[x][y] with x=xCb . . . xCb+cbWidth−1 and y=yCb . . . yCb+cbHeight−1 is set to be equal to IntraPredModeY[xCb][yCb].

TABLE 8-X1

Specification of mapping between intra prediction and affine linear weighted intra prediction modes

| IntraPredModeY[xNbX] | block size type sizeId | | |
| [yNbX] | 0 | 1 | 2 |
| --- | --- | --- | --- |
| 0 | 17 | 0 | 5 |
| 1 | 17 | 0 | 1 |
| 2, 3 | 17 | 10 | 3 |
| 4, 5 | 9 | 10 | 3 |
| 6, 7 | 9 | 10 | 3 |
| 8, 9 | 9 | 10 | 3 |
| 10, 11 | 9 | 10 | 0 |
| 12, 13 | 17 | 4 | 0 |
| 14, 15 | 17 | 6 | 0 |
| 16, 17 | 17 | 7 | 4 |
| 18, 19 | 17 | 7 | 4 |
| 20, 21 | 17 | 7 | 4 |
| 22, 23 | 17 | 5 | 5 |
| 24, 25 | 17 | 5 | 1 |
| 26, 27 | 5 | 0 | 1 |
| 28, 29 | 5 | 0 | 1 |
| 30, 31 | 5 | 3 | 1 |
| 32, 33 | 5 | 3 | 1 |
| 34, 35 | 34 | 12 | 6 |
| 36, 37 | 22 | 12 | 6 |
| 38, 39 | 22 | 12 | 6 |
| 40, 41 | 22 | 12 | 6 |
| 42, 43 | 22 | 14 | 6 |
| 44, 45 | 34 | 14 | 10 |
| 46, 47 | 34 | 14 | 10 |
| 48, 49 | 34 | 16 | 9 |
| 50, 51 | 34 | 16 | 9 |
| 52, 53 | 34 | 16 | 9 |
| 54, 55 | 34 | 15 | 9 |
| 56, 57 | 34 | 13 | 9 |
| 58, 59 | 26 | 1 | 8 |

TABLE 8-X1-continued

Specification of mapping between intra prediction
and affine linear weighted intra prediction modes

| IntraPredModeY[xNbX] [yNbX] | block size type sizeId | | |
|---|---|---|---|
| | 0 | 1 | 2 |
| 60, 61 | 26 | 1 | 8 |
| 62, 63 | 26 | 1 | 8 |
| 64, 65 | 26 | 1 | 8 |
| 66 | 26 | 1 | 8 |

TABLE 8-X2

Specification of affine linear weighted
intra prediction candidate modes

| | candidate mode | | |
|---|---|---|---|
| | 0 | 1 | 2 |
| lwipMpmCand[0] | 17 | 34 | 5 |
| lwipMpmCand[1] | 0 | 7 | 16 |
| lwipMpmCand[2] | 1 | 4 | 6 |

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 14A:
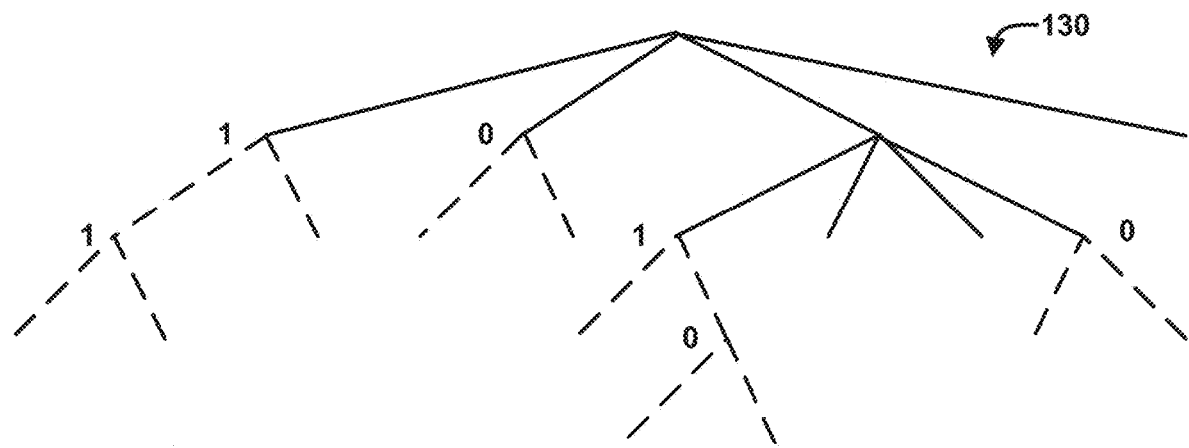
FIGS. 14A and 14B are conceptual diagrams illustrating an example quadtree binary tree (QTBT) structure, and a corresponding coding tree unit (CTU).
Figure 14B:
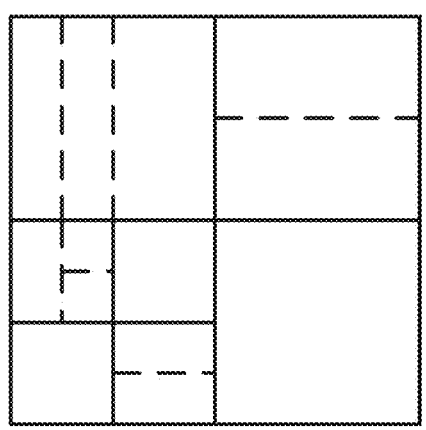

FIGS. 14A and 14B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level (i.e., the first level) of QTBT structure 130 (i.e., the solid lines) and syntax elements (such as splitting information) for a prediction tree level (i.e., the second level) of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 14B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have sizes from 16×16 (i.e., the MinQTSize) to 128×128 (i.e., the CTU size). If the quadtree leaf node is 128×128, it will not be further split by the binary tree, since the size exceeds the MaxBTSize (i.e., 64×64, in this example). Otherwise, the quadtree leaf node will be further partitioned by the binary tree. Therefore, the quadtree leaf node is also the root node for the binary tree and has a binary tree depth as 0. When the binary tree depth reaches MaxBTDepth (4, in this example), no further splitting is permitted. When the binary tree node has width equal to MinBTSize (4, in this example), it implies that no further vertical splitting is permitted. Similarly, a binary tree node having a height equal to MinBTSize that implies no further horizontal splitting is permitted for that binary tree node. As noted above, leaf nodes of the binary tree are referred to as CUs and are further processed according to prediction and transform without further partitioning.

Figure 15:
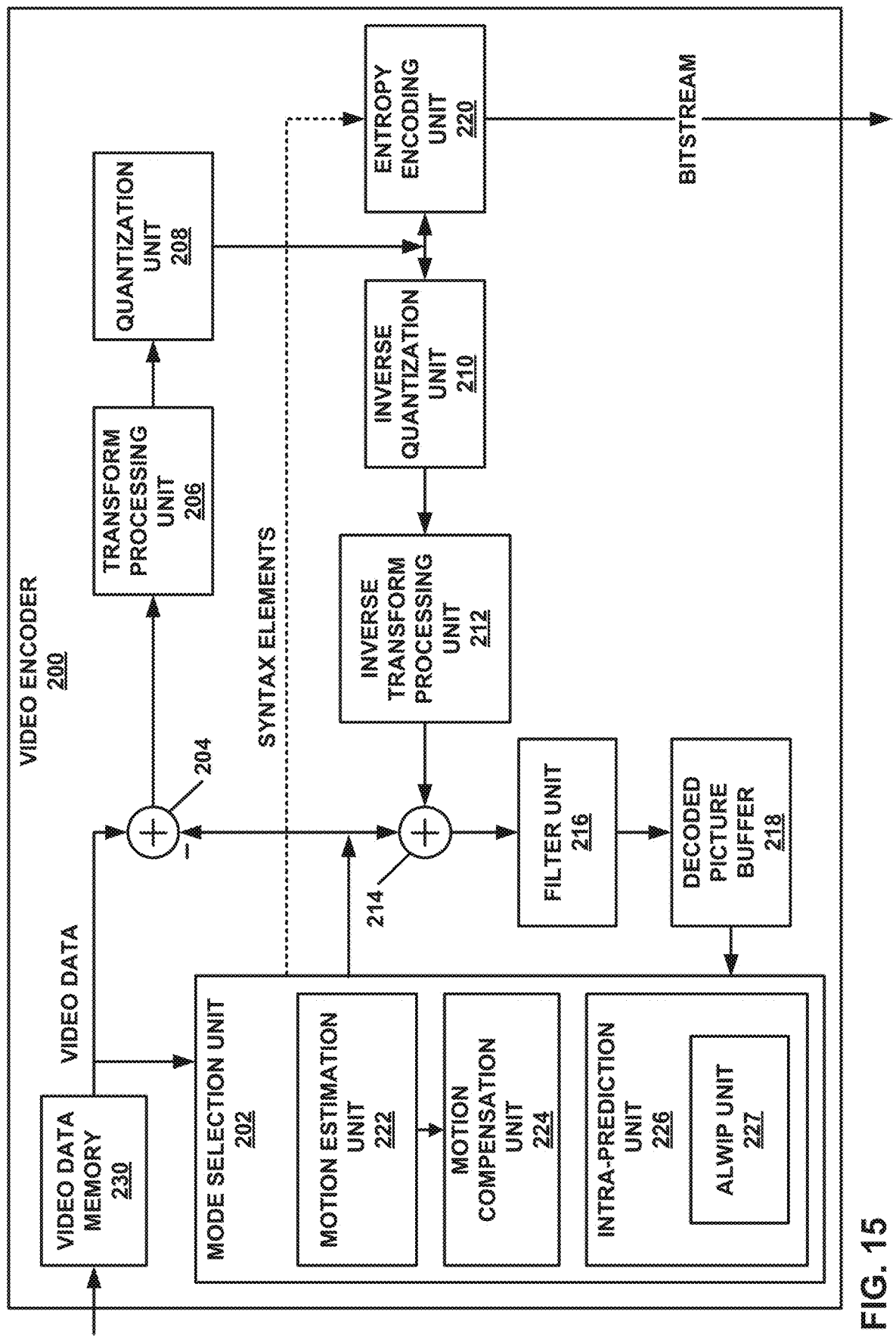
FIG. 15 is a block diagram illustrating an example video encoder that may perform the techniques of this disclosure.

FIG. 15 is a block diagram illustrating an example video encoder 200 that may perform the techniques of this disclosure. FIG. 15 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 15, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 15 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like. For instance, in the example of FIG. 15, intra-prediction unit 226 includes an ALWIP unit 227 configured to perform ALWIP.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that define the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

In accordance with one example of the third technique of this disclosure, intra-prediction unit 226 may perform an MPM derivation process that derives one or more MPMs for a current block of the video data. In this example, the current block is not coded using ALWIP. As part of performing the MPM derivation process, intra-prediction unit 226 may determine whether a neighboring block of the current block is an ALWIP-coded neighboring block. Based on the neighboring block being an ALWIP-coded neighboring block, intra-prediction unit 226 may determine that a value of an intra prediction mode of the neighboring block is a default value, such as a value corresponding to a planar mode. Intra-prediction unit 226 may include an intra prediction mode corresponding to the default value as one of the one or more MPMs. Video encoder 200 may encode the current block based on one of the MPMs for the current block or another intra prediction mode. For instance, as part of video encoder 200 encoding the current block, intra-prediction unit 226 may use one of the MPMs or another intra prediction mode to generate a prediction block for the current block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma PU and corresponding chroma PUs. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may apply multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to perform the ALWIP techniques of this disclosure. For instance, video encoder 200 may represent an example of a device including a memory configured to store video data and one or more processing units implemented in circuitry and configured to perform a MPM derivation process that derives one or more MPMs for a current block of the video data, wherein the current block is not coded using ALWIP. In this example, the one or more processors are configured such that, as part of performing the MPM derivation process, the one or more processors determine whether a neighboring block of the current block is an ALWIP-coded neighboring block. Furthermore, the one or more processors are configured to, based on the neighboring block being an ALWIP-coded neighboring block, determine that a value of an intra prediction mode of the neighboring block is a default value, such as a value corresponding to a planar mode. The one or more processors may further be configured to include an intra prediction mode corresponding to the default value as one of the one or more MPMs. The one or more processors may encode the current block based on one of the MPMs for the current block.

Furthermore, in some examples where a block is a chroma block coded with a DM mode, video encoder 200 represents an example of a device that includes a memory configured to store video data and one or more processors configured to determine whether a collocated luma block is coded with ALWIP. In such examples, the collocated luma block is collocated with the block. Furthermore, in such examples, the one or more processors may, based on the collocated luma block being coded with ALWIP, determine, e.g., infer, that an intra prediction mode of the collocated luma block is a default value. In other words, the one or more processors may determine or otherwise treat the intra prediction mode of the collocated luma block as being a default intra prediction mode, such as the planar intra prediction mode. The one or more processors may be configured to encode the block using an intra prediction mode corresponding to the default value.

Figure 16:
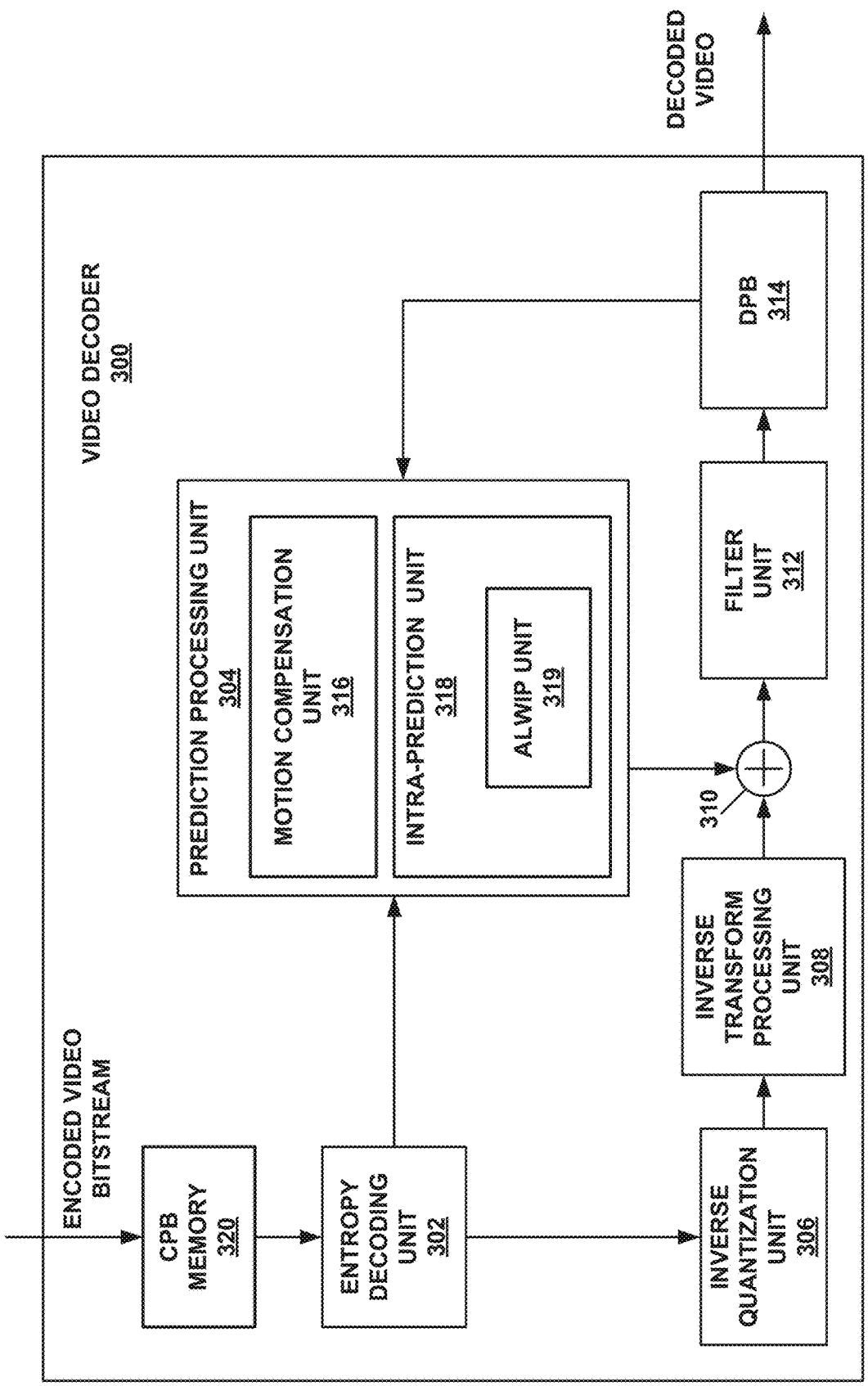
FIG. 16 is a block diagram illustrating an example video decoder that may perform the techniques of this disclosure.

FIG. 16 is a block diagram illustrating an example video decoder 300 that may perform the techniques of this disclosure. FIG. 16 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 16, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. For instance, in the example of FIG. 16, intra-prediction unit 318 includes an ALWIP unit 319 that performs an ALWIP process. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 16 are illustrated to assist with understanding the operations performed by video decoder 300. The units may be implemented as fixed-function circuits, programmable circuits, or a combination thereof. Similar to FIG. 15, fixed-function circuits refer to circuits that provide particular functionality, and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 15).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 15). Intra-prediction unit 318 may retrieve data of neighboring samples to the current block from DPB 314.

In accordance with one example of the third technique of this disclosure, intra-prediction unit 318 may perform an MPM derivation process that derives one or more MPMs for a current block of the video data. In this example, the current block is not coded using ALWIP. As part of performing the MPM derivation process, intra-prediction unit 318 may determine whether a neighboring block of the current block is an ALWIP-coded neighboring block. Based on the neighboring block being an ALWIP-coded neighboring block, intra-prediction unit 318 may determine that a value of an intra prediction mode of the neighboring block is a default value, such as a value corresponding to a planar mode. Intra-prediction unit 318 may include an intra prediction mode corresponding to the default value as one of the one or more MPMs. Video decoder 300 may decode the current block based on one of the MPMs for the current block or another intra prediction mode. For instance, as part of video decoder 300 coding the current block, intra-prediction unit 318 may use one of the MPMs or another intra prediction mode to generate a prediction block for the current block.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to perform the ALWIP techniques of this disclosure. For instance, video decoder 300 may represent an example of a device including a memory configured to store video data and one or more processing units implemented in circuitry and configured to perform a MPM derivation process that derives one or more MPMs for a current block of the video data, wherein the current block is not coded using ALWIP. In this example, the one or more processors are configured such that, as part of performing the MPM derivation process, the one or more processors determine whether a neighboring block of the current block is an ALWIP-coded neighboring block. Furthermore, the one or more processors are configured to, based on the neighboring block being an ALWIP-coded neighboring block, determine that a value of an intra prediction mode of the neighboring block is a default value, such as a value corresponding to a planar mode. The one or more processors may include an intra prediction mode corresponding to the default as one of the one or more MPMs. The one or more processors may decode the current block based on one of the MPMs for the current block.

Furthermore, in some examples where a block is a chroma block coded with a DM mode, video encoder 200 represents an example of a device that includes a memory configured to store video data and one or more processors configured to determine whether a collocated luma block is coded with ALWIP. In such examples, the collocated luma block is collocated with the block. Furthermore, in such examples, the one or more processors may, based on the collocated luma block being coded with ALWIP, determine, e.g., infer, that an intra prediction mode of the collocated luma block is a default value. In other words, the one or more processors may determine or otherwise treat the intra prediction mode of the collocated luma block as being a default intra prediction mode, such as the planar intra prediction mode. The one or more processors may be configured to decode the block using an intra prediction mode corresponding to the default value.

Figure 17:
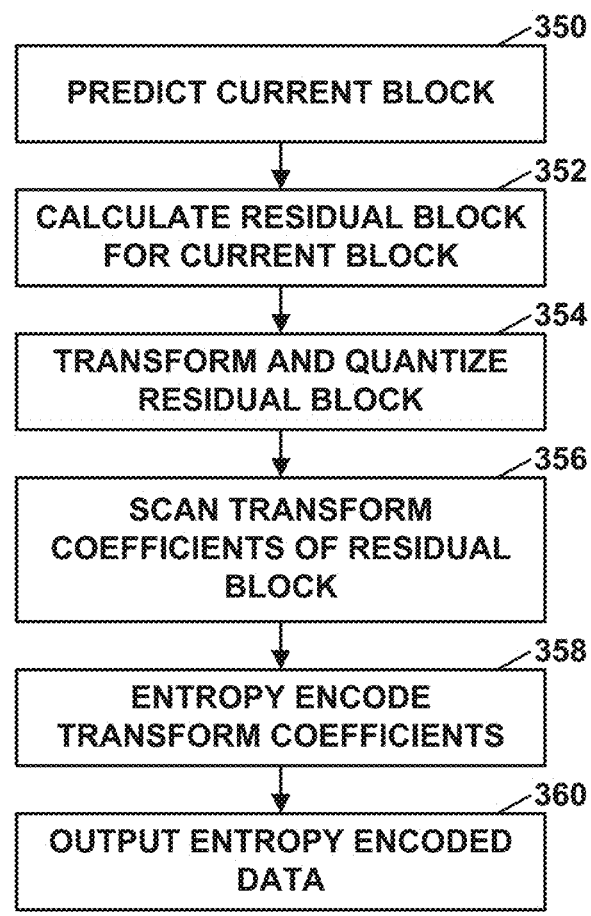
FIG. 17 is a flowchart illustrating an example method for encoding a current block.

FIG. 17 is a flowchart illustrating an example method for encoding a current block. The current block may include a current CU. Although described with respect to video encoder 200 (FIGS. 1 and 15), it should be understood that other devices may be configured to perform a method similar to that of FIG. 17.

In this example, video encoder 200 initially predicts the current block (350). For example, video encoder 200 may form a prediction block for the current block. In some examples, video encoder 200 (e.g., intra-prediction unit 226 of video encoder 200) perform an MPM derivation process that derives one or more MPMs for the current block. In this example, the current block is not coded using ALWIP. The MPMs may include intra prediction modes and, in some examples, each of the MPMs is an intra prediction mode. Furthermore, in this example, as part of performing the MPM derivation process, video encoder 200 may determine whether a neighboring block of the current block is an ALWIP-coded neighboring block and, based on the neighboring block being an ALWIP-coded neighboring block, determine that a value of an intra prediction mode of the neighboring block is a default value. Video encoder 200 may include an intra prediction mode corresponding to the default value as one of the one or more MPMs. Video encoder 200 may then use one of the MPMs or another intra prediction mode to form the prediction block for the current block.

Video encoder 200 may then calculate a residual block for the current block (352). To calculate the residual block, video encoder 200 may calculate a difference between the original, unencoded block and the prediction block for the current block. Video encoder 200 may then transform and quantize transform coefficients of the residual block (354).

Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 18:
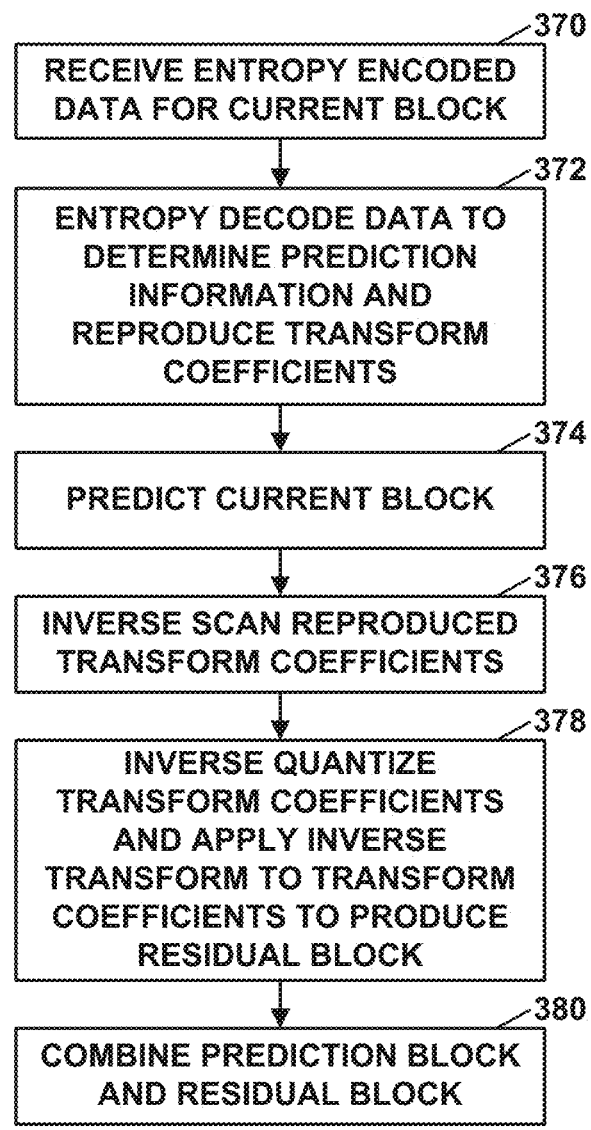
FIG. 18 is a flowchart illustrating an example method for decoding a current block of video data.

FIG. 18 is a flowchart illustrating an example method for decoding a current block of video data. The current block may include a current CU. Although described with respect to video decoder 300 (FIGS. 1 and 16), it should be understood that other devices may be configured to perform a method similar to that of FIG. 18.

Video decoder 300 may receive entropy coded data for the current block, such as entropy coded prediction information and entropy coded data for transform coefficients of a residual block corresponding to the current block (370). Video decoder 300 may entropy decode the entropy coded data to determine prediction information for the current block and to reproduce transform coefficients of the residual block (372).

Video decoder 300 may predict the current block (374), e.g., using an intra- or inter-prediction mode as indicated by the prediction information for the current block, to calculate a prediction block for the current block. In some examples, video decoder 300 (e.g., intra-prediction unit 318 of video decoder 300) perform an MPM derivation process that derives one or more MPMs for the current block. In this example, the current block is not coded using ALWIP. The MPMs may include intra prediction modes and, in some examples, each of the MPMs is an intra prediction mode. Furthermore, in this example, as part of performing the MPM derivation process, video decoder 300 may determine whether a neighboring block of the current block is an ALWIP-coded neighboring block and, based on the neighboring block being an ALWIP-coded neighboring block, determine that a value of an intra prediction mode of the neighboring block is a default value, such as a value corresponding to a planar mode. Video decoder 300 may include an intra prediction mode corresponding to the default value (e.g., the planar mode) as one of the one or more MPMs. Video decoder 300 may then use one of the MPMs or another intra prediction mode to form the prediction block for the current block.

Video decoder 300 may then inverse scan the reproduced transform coefficients (376), to create a block of quantized transform coefficients. Video decoder 300 may then inverse quantize the transform coefficients and apply one or more inverse transforms to the transform coefficients to produce a residual block (378). Video decoder 300 may decode the current block by combining the prediction block and the residual block (380).

Figure 19:
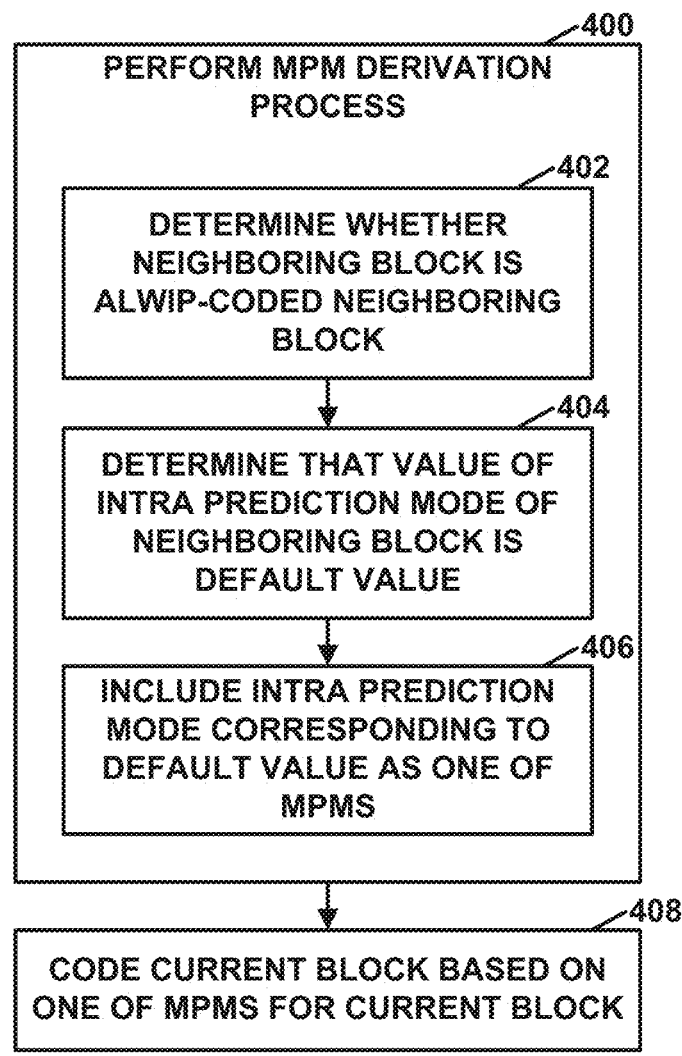
FIG. 19 is a flowchart illustrating an example method of coding video data, in accordance with one or more techniques of this disclosure.

FIG. 19 is a flowchart illustrating an example method of coding video data, in accordance with one or more techniques of this disclosure. The method of FIG. 19 may be performed by a video coder, such as video encoder 200 or video decoder 300.

In the example of FIG. 19, the video coder may perform an MPM derivation process that derives one or more MPMs for a current block of the video data (400). In some examples, intra-prediction unit 226 (FIG. 15) of video encoder 200 performs the MPM derivation process. In some examples, intra-prediction unit 318 (FIG. 16) of video decoder 300 performs the MPM derivation process. In the example of FIG. 19, the current block is not coded using ALWIP. The MPMs may include intra prediction modes and, in some examples, each of the MPMs is an intra prediction mode. In examples where the video coder is a video encoder (e.g., video encoder 200), the video encoder may be included in a device (e.g., source device 102) that includes a camera that captures a picture that includes the current block.

Furthermore, in the example of FIG. 19, performing the MPM derivation process may include the video coder determining whether a neighboring block of the current block is an ALWIP-coded neighboring block (402). The neighboring block may be an above neighboring block or a left neighboring block of the current block. In some examples, the video coder may store alwip_flags for blocks of the current picture and may use the stored alwip_flags of the neighboring block to determine whether the neighboring block is coded using ALWIP.

Based on the neighboring block being an ALWIP-coded neighboring block, the video coder may determine that a value of an intra prediction mode of the neighboring block is a default value (404). For instance, the video coder may determine (e.g., infer) the value of the intra mode of the neighboring block to be a particular value indicating the planar mode. In other words, the intra prediction mode corresponding to the default value may be the planar mode. In other examples, the intra prediction mode corresponding to the default value may be another intra prediction mode. The video coder may then include an intra prediction mode corresponding to the default value as one of the one or more MPMs for the current block (406).

The video coder may code the current block based on one of the MPMs for the current block (408). For instance, in examples where the video coder is a video encoder such as video encoder 200, the video encoder may encode the current block based on one of the MPMs for the current block. In such examples, the video encoder may use the MPM to generate a prediction block for the current block. The video encoder may then use the prediction block and samples of the current block to generate residual data for the current block. The video encoder may then process the residual data for the current block as described elsewhere in this disclosure, e.g., as with respect to FIG. 15. In examples where the video coder is a video decoder such as video decoder 300, the video decoder may decode the current block based on one of the MPMs for the current block. In such examples, the video decoder may use the MPM to generate a prediction block for the current block. The video decoder may then use the prediction block and residual data for the current block to reconstruct the current block. Furthermore, in some examples, a device that includes the video decoder may include a display that displays a picture that includes the current block.

Figure 20:
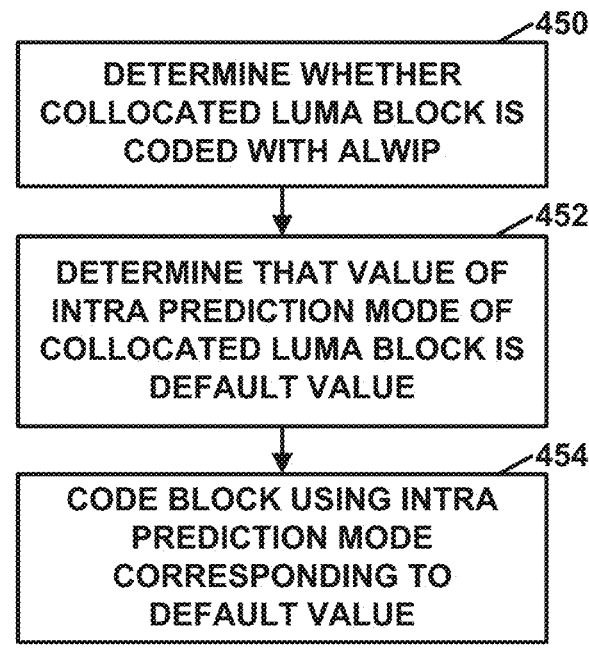
FIG. 20 is a flowchart illustrating an example method of coding a chroma block, in accordance with one or more techniques of this disclosure.

FIG. 20 is a flowchart illustrating an example method of coding a chroma block, in accordance with one or more techniques of this disclosure. In the example of FIG. 20, a video coder (e.g., video encoder 200 or video decoder 300) may be coding a chroma block using a DM mode.

Particularly, the video coder may determine whether a collocated luma block is coded with ALWIP (450). The collocated luma block is collocated with the chroma block. Based on the collocated luma block being coded with ALWIP, the video coder may determine that a value of an intra prediction mode of the collocated luma block is a default value, such as a value corresponding to the planar mode.

The video coder may then code the chroma block using an intra prediction mode corresponding to the default value (454). For instance, in examples where the video coder is a video encoder such as video encoder 200, the video encoder may generate a prediction block for the chroma block using the intra prediction mode corresponding to the default value. The video encoder may then use the prediction block and samples of the chroma block to generate residual data for the chroma block. The video encoder may then process the residual data for the chroma block as described elsewhere in this disclosure, e.g., as with respect to FIG. 15. In examples where the video coder is a video decoder such as video decoder 300, the video decoder may decode the chroma block based on the intra prediction mode corresponding to the default value. In such examples, the video decoder may use the intra prediction mode corresponding to the default value to generate a prediction block for the chroma block. The video decoder may then use the prediction block and residual data for the chroma block to reconstruct the chroma block. Furthermore, in some examples, a device that includes the video decoder may include a display that displays a picture that includes the chroma block.

The following paragraphs provide a non-limiting set of examples that are in accordance with one or more techniques of this disclosure.

Example 1. A method of coding video data, the method including: determining a context for an affine linear weighted intra prediction (ALWIP) syntax element that indicates whether a current block is coded with ALWIP, wherein an above neighbor block is determined to be unavailable for determining the context based on the above neighbor block being in a different coding tree unit (CTU) from the current block, the above neighbor block being an above neighbor of the current block; and coding the ALWIP syntax element based on the context.

Example 2. A method of coding video data, the method including: coding a set of blocks of the video data, wherein a constraint is imposed on the coding that disables affine linear weighted intra prediction (ALWIP) for those ones of the blocks that have a width less than a threshold width or a height less than a threshold height.

Example 3. A method of coding video data, the method including: determining that a neighboring block for a current block of the video data is considered unavailable based on the neighboring block being affine linear weighted intra prediction (ALWIP) coded and the neighboring block being considered in a most-probable mode (MPM) derivation of a non-ALWIP coded block of the video data; determining MPMs for the current block based on available neighboring blocks; and coding the current block based on one of the MPMs.

Example 4. A method of coding video data, the method including: assigning a default value for a most-probable mode (MPM) derivation of an ALWIP block based on a determination that a neighboring block for a current block of the video data is considered unavailable based on the neighboring block being non-affine linear weighted intra prediction (ALWIP) coded and the neighboring block being used in a most-probable mode (MPM) derivation of an ALWIP coded block of the video data; and using ALWIP to code the current block.

Example 5. A method of coding video data, the method including: deriving a most-probable mode (MPM) list for affine linear weighted intra prediction (ALWIP) based on one or more blocks in a neighborhood of a current block of the video data; and using an MPM from the MPM list to perform ALWIP to code the current block.

Example 6. The method of example 5, wherein the one or more blocks in the neighborhood of the current block include a first neighboring block that is above and adjacent to a top-right sample of the current block and a second neighboring block that is left of and adjacent to a bottom-left sample of the current block.

Example 7. A method including the methods of any combination of one or more of examples 1-6.

Example 8. The method of any of examples 1-7, wherein coding includes decoding.

Example 9. The method of any of examples 1-7, wherein coding includes encoding.

Example 10. A device for coding video data, the device including one or more means for performing the method of any of examples 1-9.

Example 11. The device of example 10, wherein the one or more means include one or more processors implemented in circuitry.

Example 12. The device of any of examples 10 and 11, further including a memory to store the video data.

Example 13. The device of any of examples 10-12, further including a display configured to display decoded video data.

Example 14. The device of any of examples 10-13, wherein the device includes one or more of a camera, a computer, a mobile device, a broadcast receiver device, or a set-top box.

Example 15. The device of any of examples 10-14, wherein the device includes a video decoder.

Example 16. The device of any of examples 10-15, wherein the device includes a video encoder.

Example 17. A computer-readable storage medium having stored thereon instructions that, when executed, cause one or more processors to perform the method of any of examples 1-7.

Example 18. A device for coding video data, the device including means for performing the methods of any of examples 1-7.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
determining a context for an affine linear weighted intra prediction (ALWIP) syntax element, wherein the ALWIP syntax element indicates whether a current block of the video data is coded with ALWIP,
wherein, based on an above neighbor block being in a different coding tree unit, CTU, from the current block, the above neighbor block is determined to be unavailable for determining the context, a value of an ALWIP syntax element for the above neighbor block is used for determining the context,
wherein the above neighbor block being an above neighbor of the current block, wherein the context for the ALWIP syntax element identifies probabilities of a bin having particular values;
coding the ALWIP syntax element based on the context;
performing a Most-Probable Mode (MPM) derivation process that derives one or more MPMs for a current block of the video data, wherein the current block is not coded using affine linear weighted intra prediction (ALWIP), and performing the MPM derivation process comprises:
determining whether a neighboring block of the current block is an ALWIP-coded neighboring block; and
based on the neighboring block being an ALWIP-coded neighboring block:
including an intra prediction mode corresponding to a value as one of the one or more MPMs, wherein the value of the intra prediction mode to be included is the same or different from the determined value of the intra-prediction mode; and
coding the current block based on one of the MPMs for the current block.

2. The method of claim 1, wherein coding the ALWIP syntax element based on the context comprises encoding the ALWIP context; and wherein coding the current block based on one of the MPMs for the current block comprises encoding the current block.

3. The method of claim 1, wherein coding the ALWIP syntax element based on the context comprises decoding the ALWIP context; and wherein coding the current block based on one of the MPMs for the current block comprises decoding the current block.

4. The method of claim 1, wherein, if a width of the current block is larger than two times a height of the current bock or the height is larger than two times the width, a value of three is determined as the context for the ALWIP syntax element.

5. A device for coding video data, the device comprising:
a memory to store the video data; and
one or more processors implemented in circuitry, the one or more processors configured to:
determine a context for an affine linear weighted intra prediction (ALWIP) syntax element, wherein the ALWIP syntax element indicates whether a current block of the video data is coded with ALWIP,
wherein, based on an above neighbor block being in a different coding tree unit, CTU, from the current block, the above neighbor block is determined to be unavailable for determining the context, a value of an ALWIP syntax element for the above neighbor block is used for determining the context,
wherein the above neighbor block being an above neighbor of the current block,
wherein the context for the ALWIP syntax element identifies probabilities of a bin having particular values;
code the ALWIP syntax element based on the context;
perform a Most-Probable Mode (MPM) derivation process that derives one or more MPMs for a current block of the video data, wherein the current block is not coded using affine linear weighted intra prediction (ALWIP), and performing the MPM derivation process comprises:
determine whether a neighboring block of the current block is an ALWIP-coded neighboring block; and
based on the neighboring block being an ALWIP-coded neighboring block:
include an intra prediction mode corresponding to a value as one of the one or more MPMs,
wherein the value of the intra prediction mode to be included is the same or different from the determined value of the intra-prediction mode; and
code the current block based on one of the MPMs for the current block.

6. The device of claim 5, wherein to code the ALWIP syntax element based on the context the processors are configured to encode the ALWIP context; and to code the current block based on one of the MPMs for the current block, the processors are configured to encode the current block.

7. The device of claim 5, wherein to code the ALWIP syntax element based on the context the processors are configured to decode the ALWIP context; and to code the current block based on one of the MPMs for the current block, the processors are configured to decode the current block.

8. The device of claim 5, wherein, if a width of the current block is larger than two times a height of the current bock or the height is larger than two times the width, a value of three is determined as the context for the ALWIP syntax element.

9. The device of claim 5, further comprising a display configured to display the video data.

10. The device of claim 5, further comprising a camera configured to capture the video data.

11. The device of claim 5, wherein the device comprises one or more of a camera, a computer, a mobile device, a broadcast receiver device, or a set-top box.

\* \* \* \* \*